United States Patent [19]

Hashimoto

[11] Patent Number: 4,666,805

[45] Date of Patent: May 19, 1987

[54] PHOTOSENSITIVE MATERIAL CONTAINING DISAZO COMPOUND FOR USE IN ELECTROPHOTOGRAPHY

[75] Inventor: Mitsuru Hashimoto, Numazu, Japan

[73] Assignee: Ricoh Co., Ltd., Tokyo, Japan

[21] Appl. No.: 743,537

[22] Filed: Jun. 11, 1985

[30] Foreign Application Priority Data

Jun. 19, 1984 [JP] Japan ................................. 59-124572
Mar. 20, 1985 [JP] Japan ................................. 60-56676

[51] Int. Cl.⁴ .................. C09B 35/039; C09B 35/215;
G03G 5/06; G03G 5/14
[52] U.S. Cl. ......................................... 430/57; 430/58;
430/59; 430/71; 430/72; 430/74; 430/75;
430/76; 430/77; 430/78; 534/561; 534/738;
534/797; 534/830
[58] Field of Search ....................... 430/57, 58, 59, 71,
430/72, 74, 75, 76, 77, 78; 534/797, 738, 830

[56] References Cited

U.S. PATENT DOCUMENTS 3,687,673  8/1972  Yoshida et al. ................... 430/59 X
4,390,611  6/1983  Ishikawa et al. ...................... 430/59
4,500,619  2/1985  Ishikawa et al. ...................... 430/59
4,533,613  8/1985  Kawamura et al. .................. 430/78

FOREIGN PATENT DOCUMENTS 57-46246   3/1982  Japan ...................... 430/59
57-47357   3/1982  Japan ...................... 430/59
58-129060  8/1983  Japan ...................... 430/59

OTHER PUBLICATIONS

Kamoshida et al., Chemical Abstracts, vol. 98, #170382s (1983).
Roemer, Chemical Abstracts, vol. 95, #186873b (1981).

Primary Examiner—Floyd D. Higel
Attorney, Agent, or Firm—Flynn, Thiel, Boutell & Tanis

[57] ABSTRACT

The present invention relates to a novel disazo compound having the following general formula (I),

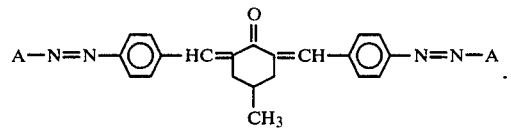

wherein A represents or (Abstract continued on next page.)

-continued

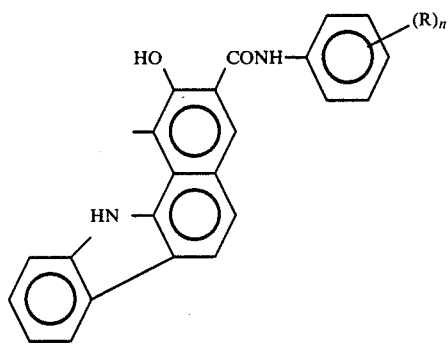

(wherein R represents an alkyl, alkoxy, nitro, halogen, cyano or halomethyl group; n represents an integer of 0, 1, 2 or 3; and R may be the same or different when n is an integer of 2 or 3), and a method for preparing the same.

The present invention further relates to a photosensitive material for use in electrophotography, characterized by providing a photosensitive layer containing a disazo pigment having the following general formula (VII),

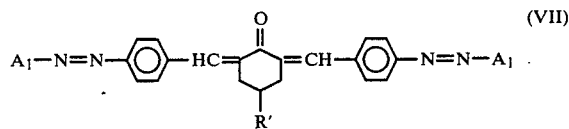

wherein $A_1$ represents a coupler residue and $R'$ represents hydrogen or a lower alkyl group.

10 Claims, 18 Drawing Figures

PHOTOSENSITIVE MATERIAL CONTAINING DISAZO COMPOUND FOR USE IN ELECTROPHOTOGRAPHY

BACKGROUND OF THE INVENTION

1. Field of the Invention

This invention relates to a novel disazo compound useful as a charge generating material of a photosensitive material, particularly laminated type photosensitive material for use in electrophotography, a method for producing said disazo compound and a photosensitive material having a photosensitive layer containing said disazo compound as a charge generating material.

2. Description of the Prior Art

Heretofore, typically known photosensitive materials include inorganic type photosensitive materials using selenium and its alloy or dispersion of zinc oxide sensitized by coloring matter in binder resin, and organic type photosensitive materials using a charge transfer complex of 2,4,7-trinitro-9-fluorenone (hereinafter referred to as "TNF") and poly-N-vinylcarbazole (hereinafter referred to as "PVK").

However, these conventional photosensitive materials have not only advantages but also various disadvantages. For example, the selenium type photosensitive material widely used at present has such disadvantages as that the manufacturing cost is high due to the severity of the manufacturing conditions; that it is difficult to work the material into a belt-like product because of lack of flexibility; and that it is difficult to handle because the material is weak to heat and mechanical shock. The zinc oxide type photosensitive material can be manufactured at a low expense by coating cheap zinc oxide on a substrate, but has such disadvantages as that the sensitivity is low; that the smoothness of the surface, hardness, tensile strength, friction resistance and other mechanical properties are inferior; and that the durability for repeated use in a plain paper copier is poor. The photosensitive material using the charge transfer complex of TNF and PVK has a low sensitivity and is unsuitable as a photosensitive material for a high speed copier.

Recently, various studies have been carried out to remove disadvantages of these photosensitive materials, and many photosensitive materials, particularly organic type photosensitive materials have been proposed. Among them, a laminated type photosensitive material prepared by forming a thin film of organic pigment on an electro-conductive substrate (charge generating layer) and overlaying a charge transfer material-containing layer (charge transfer layer) on said charge generating layer has generally higher sensitivity and more stable chargeability than the conventional organic type photosensitive materials, and is practically used in part as a photosensitive material for a plain paper copier.

Examples of this kind of known conventional laminated type photosensitive materials include as follows:

(1) photosensitive material using a thin layer formed by vapor depositing perylene derivatives as a charge transfer layer (see U.S. Pat. No. 3,871,882);

(2) photosensitive material using a thin layer formed by coating an organic amine solution of Chloro Dian Blue as a charge generating layer and hydrazone compound as a charge transfer layer (see Japanese Patent Publication No. 55-42380);

(3) photosensitive material using a thin layer formed by coating an organic solvent dispersion of distyryl benzene type disazo compound, stilbene type disazo compound or benzidine type disazo compound as a charge generating layer and hydrazone compound as a charge transfer layer (see Japanese Patent Laid Open Nos. 55-84943, 52-8832 and 52-55643); and the like.

However, these conventional laminated type photosensitive materials have not only advantages but also various disadvantages as mentioned below.

(1) The above photosensitive material using perylene derivatives and oxadiazole derivatives has a disadvantage that the manufacturing cost is very high because of forming a charge generating layer by vapor deposition.

(2) The above photosensitive material using Chloro Dian Blue and hydrazone compound must use an organic amine (for example, ethylene diamine) as a coating solvent for forming a charge generating layer, which is difficult in handling. Furthermore, it has a disadvantage that the image reproducibility of a reddish original is poor because the photosensitive wavelength range of the visible light zone lies in the range of about 450–660 nm. Therefore, it is necessary to provide a filter to cut red light when used in a copier, thus being disadvantageous to the design of a copier.

(3) The above photosensitive materials using distyryl benzene type disazo compound, stilbene type disazo compound or benzidine type disazo compound and hydrazone compound have an advantage that the charge generating layer can easily be prepared simply by coating a dispersion of the disazo compound, but also have a disadvantage that the image reproducibility of a reddish original is poor in the same manner as in the above photosensitive material (2) since the photosensitive wave length lies in the range of about 450–700 nm.

SUMMARY OF THE INVENTION

An object of the present invention is to provide a novel disazo compound having a photosensitive wavelength range of the visible light zone in a shorter wavelength zone (about 450–600 nm) and therefore having an excellent image reproducibility of a reddish original, the sensitivity of which is higher when used as a charge generating material for a photosensitive material, particularly layered type photosensitive material for use in electrophotography, than those of the conventional disazo compounds, a method for preparing said novel disazo compound, and a photosensitive material containing said novel disazo compound for use in electrophotography.

The novel disazo compound of the present invention has the following general formula (I),

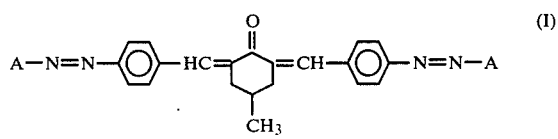

wherein A represents

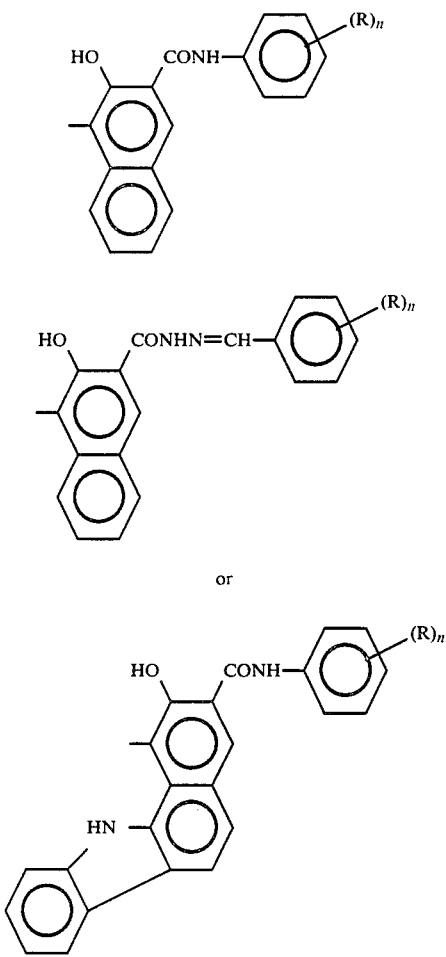

(wherein R represents an alkyl, alkoxy, nitro, halogen, cyano or halomethyl group; n represents an integer of 0, 1, 2 or 3; and R may be the same or different when n is an integer of 2 or 3).

The method for preparing the novel disazo compound having the above general formula (I) of the present invention is characterized by comprising diazotizing a diamino compound having the formula (II),

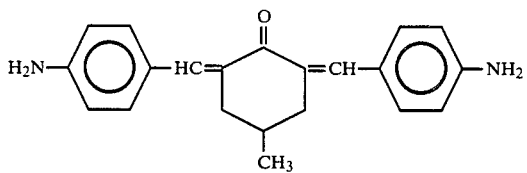

to prepare a tetrazonium salt having the general formula (III),

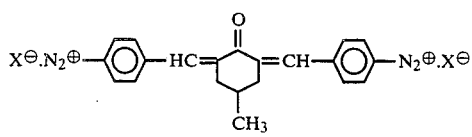

(wherein X represents an anion functional group), and reacting the tetrazonium salt thus prepared with a compound (hereinafter referred to as a coupler) having the following general formula (IV), (V) or (VI),

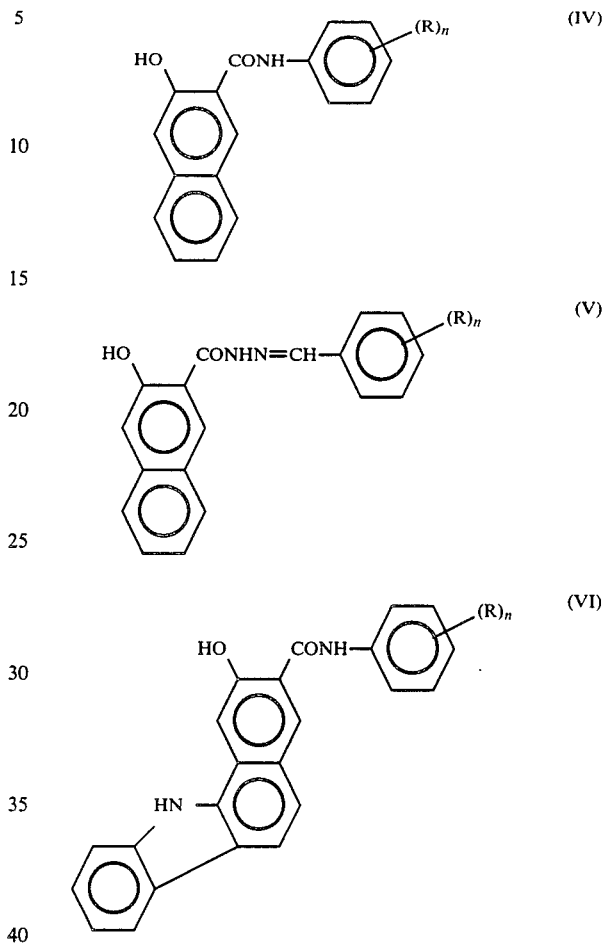

(wherein R represents an alkyl, alkoxy, nitro, halogen, cyano or halomethyl group; n represents an integer of 0, 1, 2 or 3; and R may be the same or different when n is an integer of 2 or 3).

The photosensitive material for use in electrophotography of the present invention is characterized by providing a photosensitive layer containing a disazo pigment having the following general formula (VII),

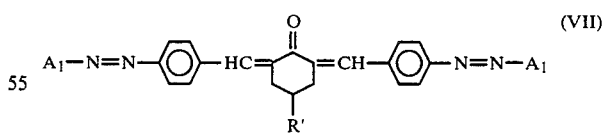

wherein $A_1$ represents a coupler residue and R' represents hydrogen or a lower alkyl group.

DETAILED DESCRIPTION OF THE PRESENT INVENTION

Figure 1:
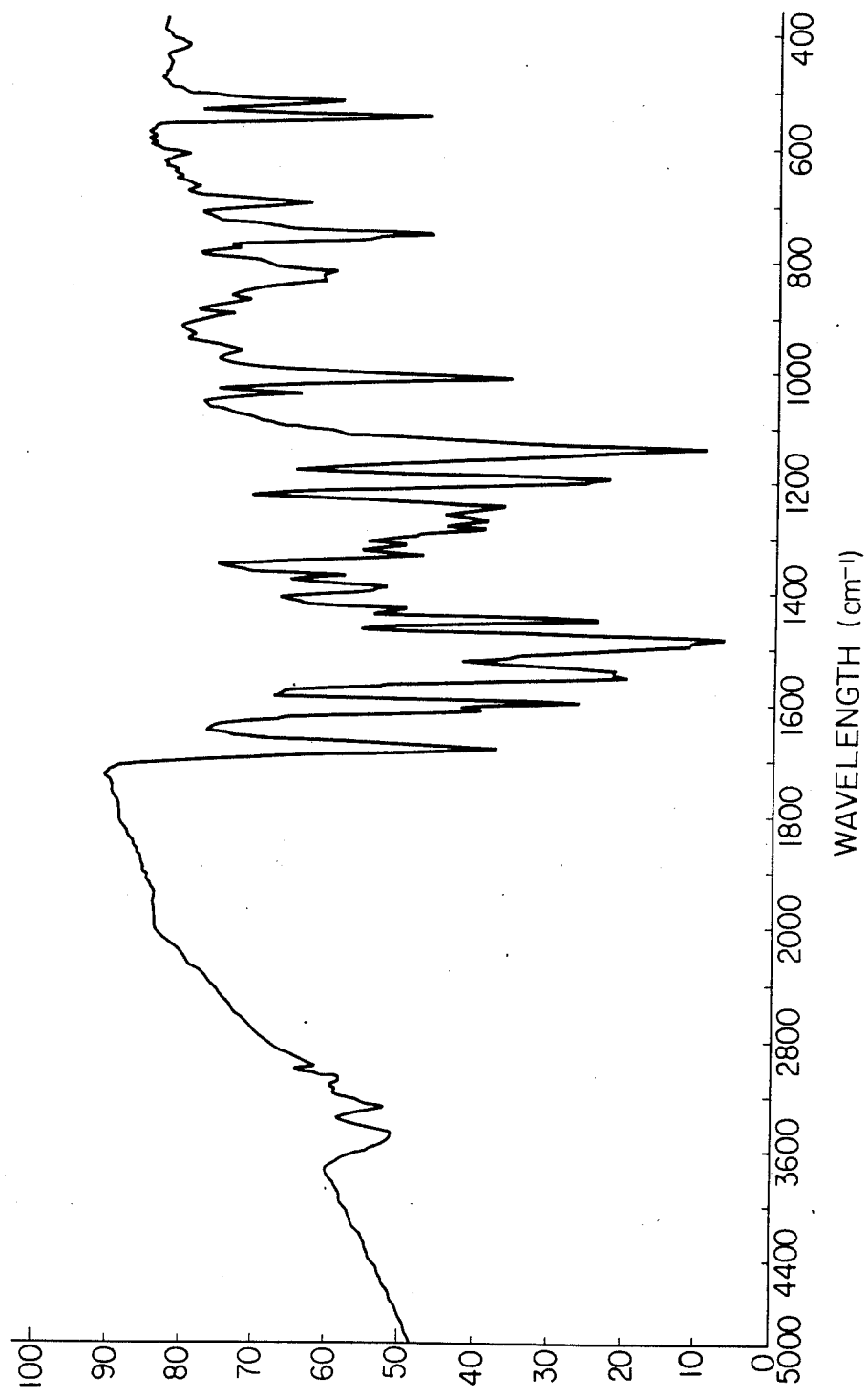
FIGS. 1 to 16 show infrared absorption spectrums (KBr disk).

We have studied for developing a photosensitive material having a high sensitivity for use in electrophotography, which can be easily prepared and has a photosensitive wave length zone residing in such a shorter wave length zone as to be suitable for reproducing an image of a reddish original. As the result of this study, we have found that the above mentioned object can be achieved by using the specific disazo compound having the above general formula (VII) of the present invention as a charge generating material.

Examples of the coupler of the disazo compounds expressed by the general formula (VII) include an aromatic hydrocarbon compound and heterocyclic compound having a phenolic hydroxyl group such as phenol type, naphthol type compounds and the like; an aromatic hydrocarbon compound and heterocyclic compound having an amino group; an aromatic hydrocarbon compound and heterocyclic compound having an amino group and a phenolic hydroxyl group such as aminophthols; a compound having an aliphatic or aromatic enol type ketone group (compound having an active methylene group) and the like. Preferably, the residue $A_1$ of the coupler is expressed by the following general formula (VIII), (IX), (X), (XI), (XII), (XIII), (XIV), (XV), (XVI), (XVII) and (XVIII).

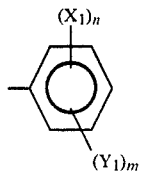
(VIII)

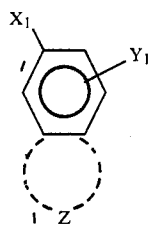
(IX)

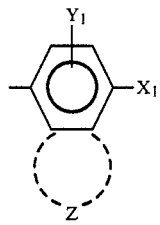
(X)

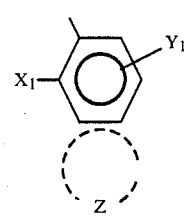
(XI)

wherein $X_1$, $Y_1$, $Z$, m and n in the above formula (VIII), (IX), (X) and (XI) represent the following groups: $X_1$:

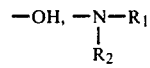

or —$NHSO_2$—$R_3$ (wherein $R_1$ and $R_2$ represent hydrogen or a substituted or non-substituted alkyl group, and $R_3$ represents a substituted or non-substituted alkyl or a substituted or non-substituted aryl group); $Y_1$: hydrogen, halogen, substituted or non-substituted alkyl group, substituted or non-substituted alkoxy group, carboxyl group, sulfo group, substituted or non-substituted sulfamoyl group or

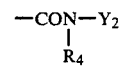

(wherein $R_4$ represents hydrogen, alkyl group or its substituted compound, phenyl group or its substituted compound, and $Y_2$ represents cyclic hydrocarbon or its substituted compound, heterocycle or its substituted compound, or

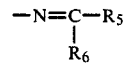

wherein $R_5$ represents a cyclic hydrocarbon or its substituted compound, heterocycle or its substituted compound, or styryl group or its substituted compound, and $R_6$ represents hydrogen, alkyl group, phenyl group or their substituted compound, or $R_5$ and $R_6$ may form a ring with carbons bonded thereto);

Z: cyclic hydrocarbon or its substituted compound, or heterocycle or its substituted compound;

n: an integer of 1 or 2; and m: an integer of 1 or 2.

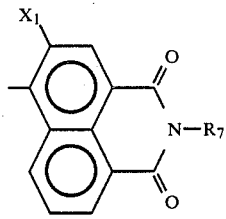
(XII)

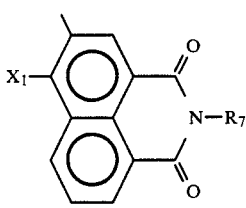
(XIII)

wherein $R_7$ in the above formula (XII) and (XIII) represents a substituted or non-substituted hydrocarbonyl group, and $X_1$ is the same as mentioned above.

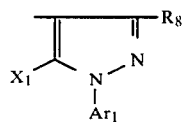 (XIV)

wherein $R_8$ represents an alkyl group, carbamoyl group, carboxyl group or its ester, and $Ar_1$ represents a cyclic hydrocarbon or its substituted compound, and $X_1$ is the same as mentioned above.

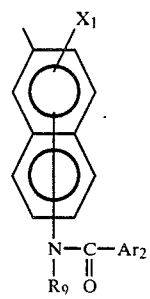 (XV)

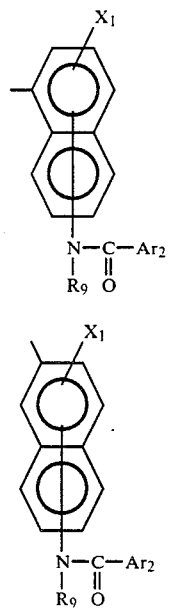 (XVI)

wherein $R_9$ is the above formula (XV) and (XVI) represents hydrogen or substituted or non-substituted hydrocarbonyl group, and $Ar_2$ represents cyclic hydrocarbon or its substituted compound.

Examples of the cyclic hydrocarbon expressed by Z in the above general formula (VIII), (IX), (X) or (XI) include benzene ring, naphthalene ring and the like, and examples of the heterocycle expressed by the same include indole ring, carbazole ring, benzofuran ring, ring and the like. Examples of the substituent of the ring expressed by Z include a halogen atom such as chlorine, bromine, and the like.

Examples of the cyclic hydrocarbon expressed by $Y_2$ or $R_5$ include phenyl, naphthyl, anthryl, pyrenyl and the like, and examples of the heterocyclic group expressed by the same include pyridyl, thienyl, furyl, indolyl, benzofuranyl, carbazolyl, dibenzofuranyl and the like. Examples of the ring formed by bonding $R_5$ and $R_6$ include fluorene ring.

Examples of the substituents for the cyclic hydrocarbon or heterocycle expressed by $Y_2$ or $R_5$ or for the ring formed by bonding $R_5$ and $R_6$ include an alkyl group such as methyl, ethyl, propyl, butyl or the like; an alkoxy group such as methoxy, ethoxy, propoxy, butoxy or the like; a halogen atom such as chlorine, bromine or the like; a dialkyl amino group such as dimethyl amino, diethyl amino or the like; a diaralkyl amino group such as dibenzyl amino or the like; a halomethyl group such as trifluoromethyl or the like; nitro group; cyano group; carboxyl group or its ester; hydroxyl group; sulphonate group such as —$SO_3Na$; and the like.

Examples of the substituent for the phenyl group expressed by $R_4$ include a halogen atom such as chlorine or bromine.

Examples of the hydrocarbonyl group expressed by $R_7$ and $R_9$ include an alkyl group such as methyl, ethyl, propyl, butyl and the like; an aralkyl group such as benzyl and the like; an aryl group such as phenyl; or their substituted compounds.

Examples of the substituent for the hydrocarbonyl group expressed by $R_7$ or $R_9$ include an alkyl group such as methyl, ethyl, propyl, butyl and the like; an alkoxy group such as methoxy, ethoxy, propoxy, butoxy and the like; a halogen atom such as chlorine, bromine and the like; hydroxyl group; nitro group; and the like.

Examples of the cyclic hydrocarbon expressed by $Ar_1$ or $Ar_2$ include phenyl, naphthyl and the like, and examples of the substituents for these groups include an alkyl group such as methyl, ethyl, propyl, butyl or the like; an alkoxy group such as methoxy, ethoxy, propoxy, butoxy or the like; nitro group; a halogen group such as chlorine, bromine or the like; cyano group; and a dialkyl amino group such as dimethyl amino, diethyl amino or the like.

Among the groups expressed by $X_1$, hydroxyl group is particularly suitable.

Among the above coupler residues, preferable ones are expressed by the general formula (IX), (XII), (XIII), (XIV), (XV) and (XVI), and $X_1$ in the general formula is preferably hydroxyl group. Among them, the coupler residue expressed by the general formula (XVII)

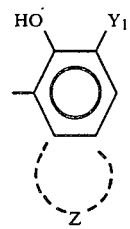 (XVII)

(wherein $Y_1$ and Z are the same as mentioned above) is preferable, and the coupler residue expressed by the general formula (XVIII)

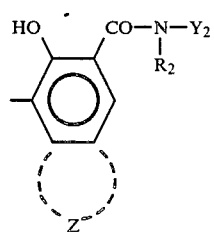 (XVIII)

(wherein Z, $Y_2$ and $R_2$ are the same as mentioned above) is more preferable.

Still more preferable coupler residue among the above mentioned groups is expressed by the general formula (XIX) or (XX)

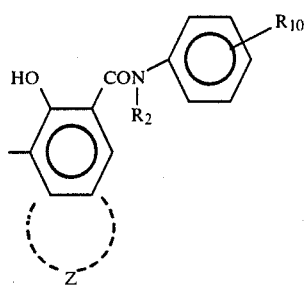 (XIX)

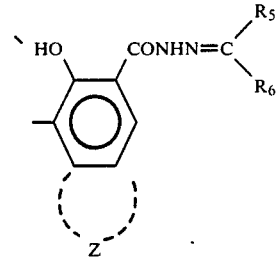 (XX)

(wherein Z, $R_2$, $R_5$ and $R_6$ are the same as mentioned above, and $R_{10}$ is the same as those illustrated with regard to the substituents for $Y_2$).

Examples of the disazo compound of the present invention are illustrated by the following structural formulas.

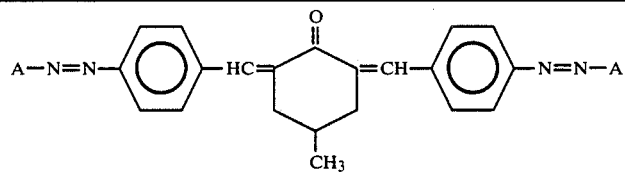

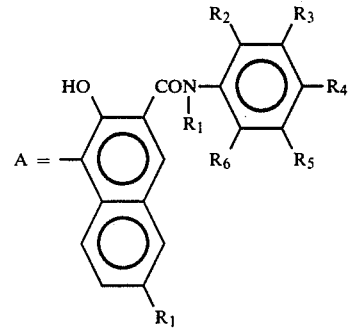

| Disazo Compound No. | $R_1$ | $R_2$ | $R_3$ | $R_4$ | $R_5$ | $R_6$ | $R_7$ |
|---|---|---|---|---|---|---|---|
| 1 | H | H | H | H | H | H | H |
| 2 | H | $NO_2$ | H | H | H | H | H |
| 3 | H | H | $NO_2$ | H | H | H | H |
| 4 | H | H | H | $NO_2$ | H | H | H |
| 5 | H | $CF_3$ | H | H | H | H | H |
| 6 | H | H | $CF_3$ | H | H | H | H |
| 7 | H | H | H | $CF_3$ | H | H | H |
| 8 | H | CN | H | H | H | H | H |
| 9 | H | H | CN | H | H | H | H |
| 10 | H | H | H | CN | H | H | H |
| 11 | H | I | H | H | H | H | H |
| 12 | H | H | I | H | H | H | H |
| 13 | H | H | H | I | H | H | H |
| 14 | H | Br | H | H | H | H | H |
| 15 | H | H | Br | H | H | H | H |
| 16 | H | H | H | Br | H | H | H |
| 17 | H | Cl | H | H | H | H | H |
| 18 | H | H | Cl | H | H | H | H |
| 19 | H | H | H | Cl | H | H | H |
| 20 | H | F | H | H | H | H | H |
| 21 | H | H | F | H | H | H | H |
| 22 | H | H | H | F | H | H | H |
| 23 | H | $CH_3$ | H | H | H | H | H |
| 24 | H | H | $CH_3$ | H | H | H | H |
| 25 | H | H | H | $CH_3$ | H | H | H |
| 26 | H | $C_2H_5$ | H | H | H | H | H |
| 27 | H | H | H | $C_2H_5$ | H | H | H |
| 28 | H | $OCH_3$ | H | H | H | H | H |
| 29 | H | H | $OCH_3$ | H | H | H | H |
| 30 | H | H | H | $OCH_3$ | H | H | H |
| 31 | H | $OC_2H_5$ | H | H | H | H | H |

-continued

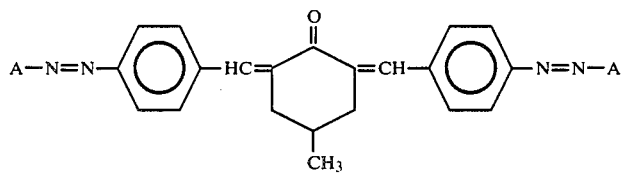

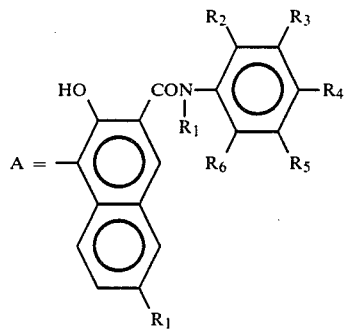

| Disazo Compound No. | R₁ | R₂ | R₃ | R₄ | R₅ | R₆ | R₇ |
|---|---|---|---|---|---|---|---|
| 32 | H | H | OC$_2$H$_5$ | H | H | H | H |
| 33 | H | H | H | OC$_2$H$_5$ | H | H | H |
| 34 | H | H | H | N(CH$_3$)$_2$ | H | H | H |
| 35 | CH$_3$ | H | H | H | H | H | H |
| 36 | —C$_6$H$_5$ | H | H | H | H | H | H |
| 37 | H | OCH$_3$ | H | H | OCH$_3$ | H | H |
| 38 | H | OC$_2$H$_5$ | H | H | OC$_2$H$_5$ | H | H |
| 39 | H | CH$_3$ | H | H | CH$_3$ | H | H |
| 40 | H | Cl | H | H | Cl | H | H |
| 41 | H | CH$_3$ | H | H | Cl | H | H |
| 42 | H | OCH$_3$ | H | OCH$_3$ | H | H | H |
| 43 | H | CH$_3$ | H | CH$_3$ | H | H | H |
| 44 | H | CH$_3$ | H | Cl | H | H | H |
| 45 | H | NO$_2$ | H | OCH$_3$ | H | H | H |
| 46 | H | H | OCH$_3$ | H | OCH$_3$ | H | H |
| 47 | H | OCH$_3$ | H | H | Cl | H | H |
| 48 | H | OCH$_3$ | H | Cl | OCH$_3$ | H | H |
| 49 | H | OCH$_3$ | H | OCH$_3$ | Cl | H | H |
| 50 | H | CH$_3$ | H | H | H | CH$_3$ | H |
| 51 | H | OCH$_3$ | H | H | Cl | H | H |
| 52 | H | CH$_3$ | H | OCH$_3$ | H | H | H |
| 53 | H | OCH$_3$ | H | Cl | CH$_3$ | H | H |
| 54 | H | H | H | H | H | H | OCH$_3$ |
| 55 | H | CH$_3$ | H | H | H | H | OCH$_3$ |
| 56 | H | OCH$_3$ | H | Cl | OCH$_3$ | H | OCH$_3$ |
| 57 | H | OCH$_3$ | H | H | H | H | Br |

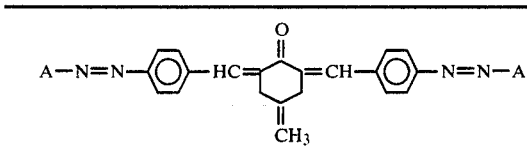
| Disazo Compound No. | A |
|---|---|
| 58 | 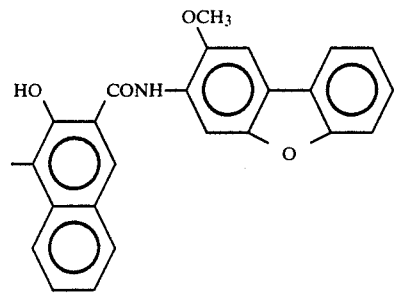 |
| 59 | 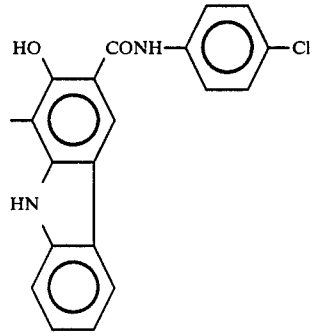 |
| 60 | 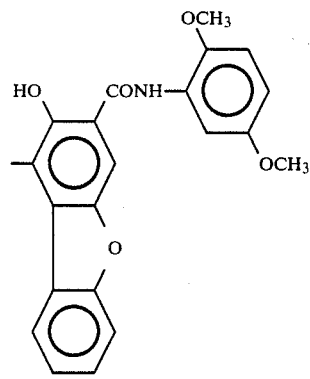 |
| 61 | 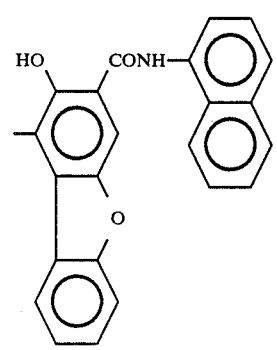 |
-continued
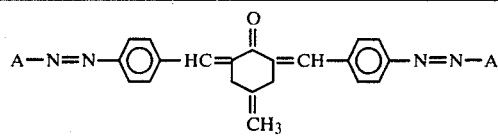
| Disazo Compound No. | A |
|---|---|
| 62 | 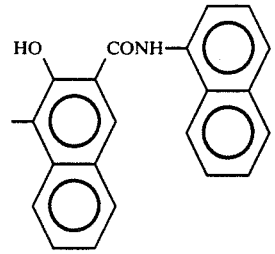 |
| 63 | 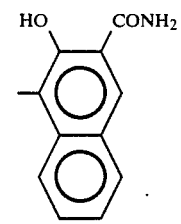 |
| 64 | 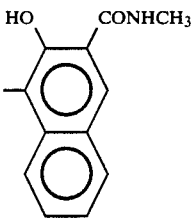 |
| 65 | 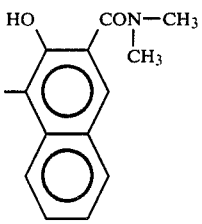 |
| 66 | 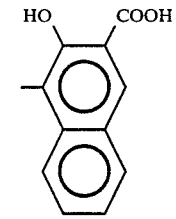 |
| 67 | 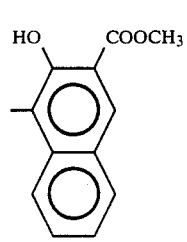 |

4,666,805
-continued
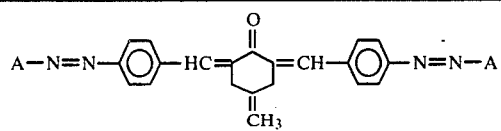
| Disazo Compound No. | A |
|---|---|
| 68 | 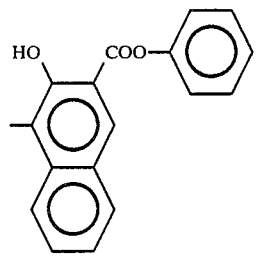 |
| 69 | 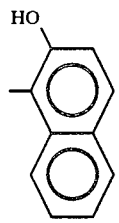 |
| 70 | 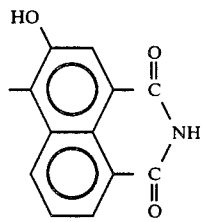 |
| 71 | 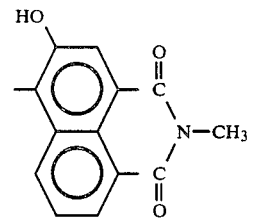 |
| 72 | 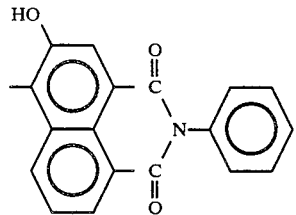 |
| 73 | 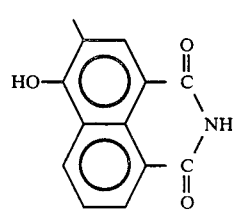 |
-continued
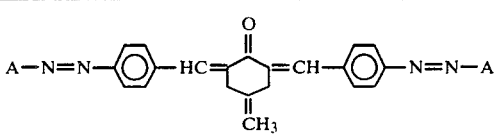
| Disazo Compound No. | A |
|---|---|
| 74 | 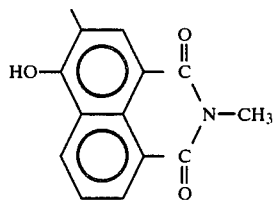 |
| 75 | 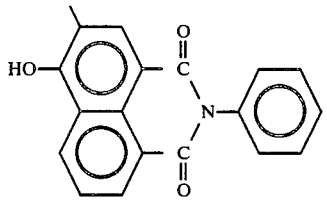 |
| 76 | 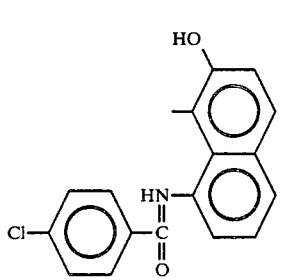 |
| 77 | 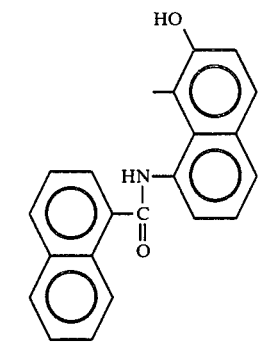 |
| 78 | 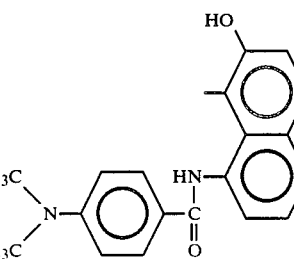 |

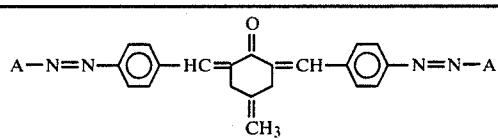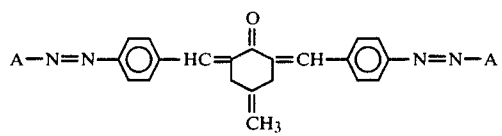

-continued
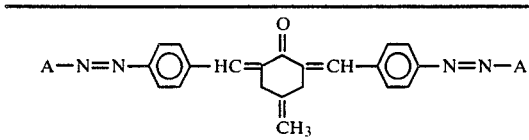
| Disazo Compound No. | A |
|---|---|
| 88 | 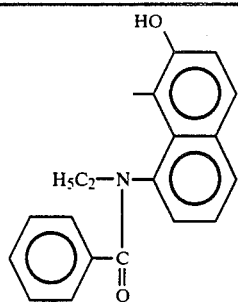 |
| 89 | 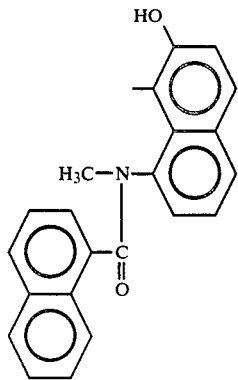 |
| 90 | 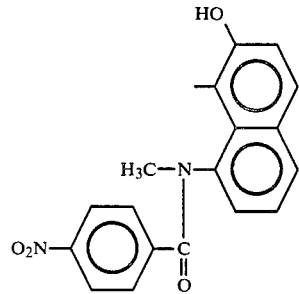 |
| 91 | 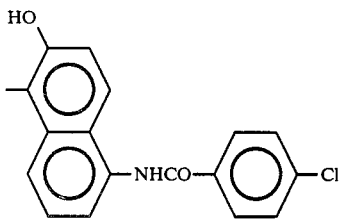 |
| 92 | 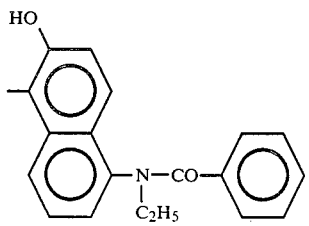 |
-continued
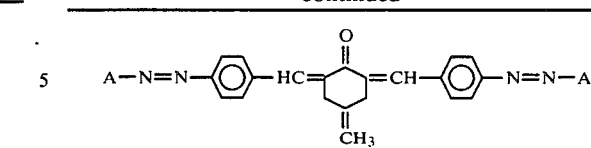
| Disazo Compound No. | A |
|---|---|
| 93 | 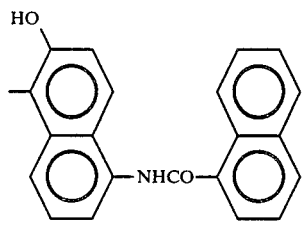 |
| 94 | 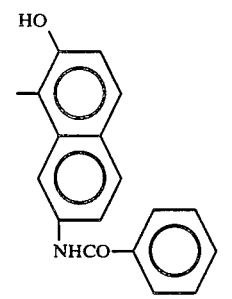 |
| 95 | 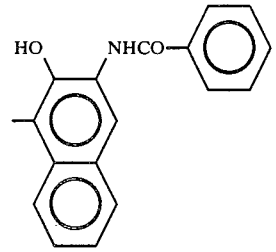 |
| 96 | 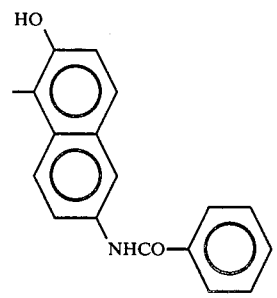 |
| 97 | 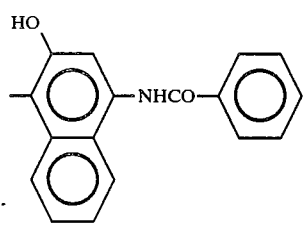 |

| 21 | | 22 | |
|---|---|---|---|
| -continued | | -continued | |
| 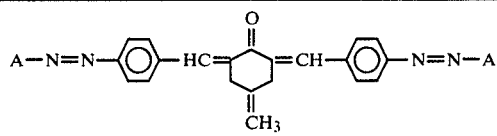 | | 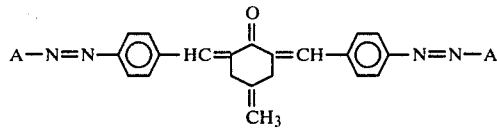 | |
| Disazo Compound No. | A | Disazo Compound No. | A |
| 98 | 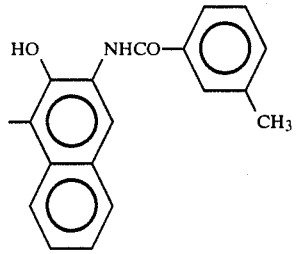 | 104 | 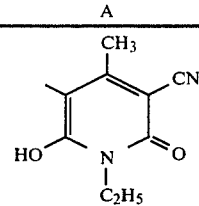 |
| 99 | 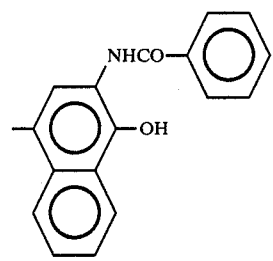 | 105 | 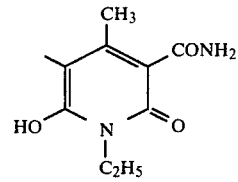 |
| 100 | 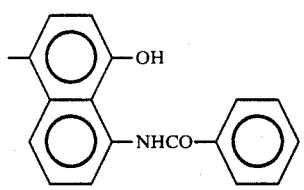 | 106 | 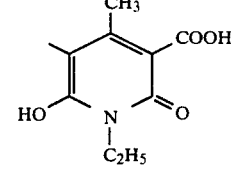 |
| 101 | 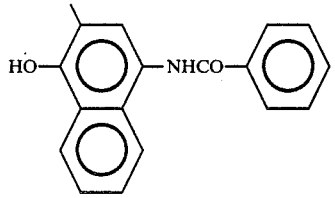 | 107 | 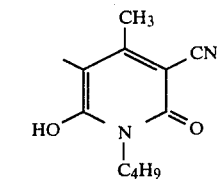 |
| 102 | 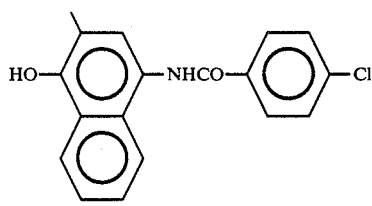 | 108 | 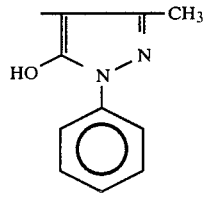 |
| 103 | 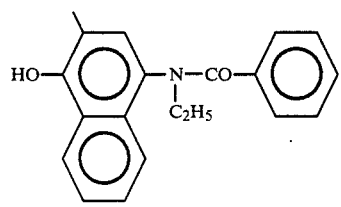 | 109 | 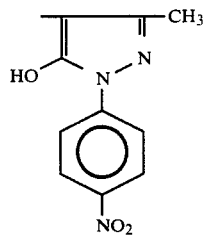 |
| | | 110 | 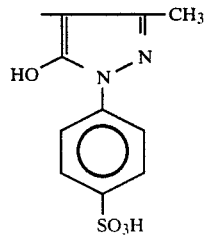 |

-continued
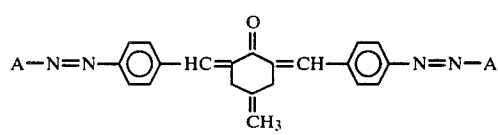
| Disazo Compound No. | A |
|---|---|
| 111 | 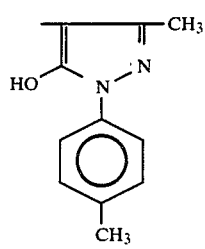 |
| 112 | 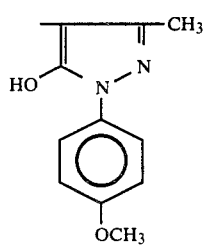 |
| 113 | 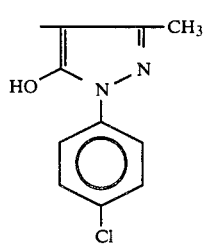 |
| 114 | 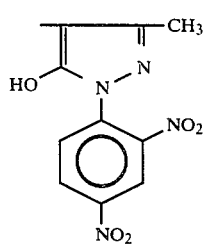 |
| 115 | 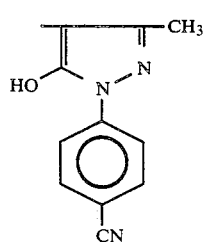 |
-continued
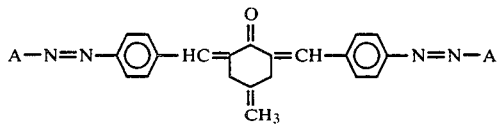
| Disazo Compound No. | A |
|---|---|
| 116 | 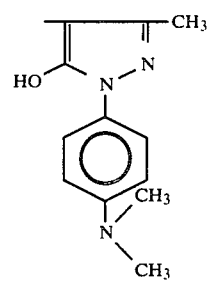 |
| 117 | 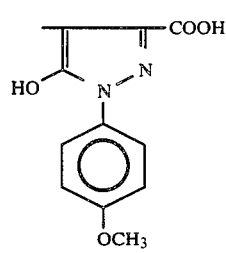 |
| 118 | 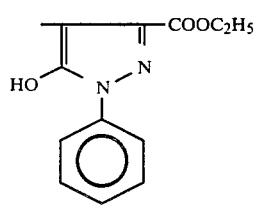 |
| 119 | 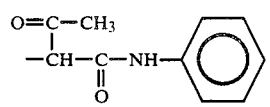 |
| 120 | 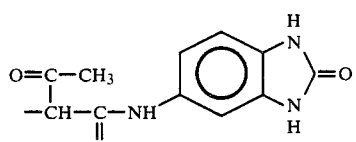 |

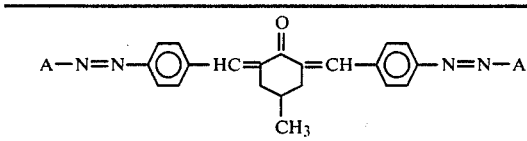

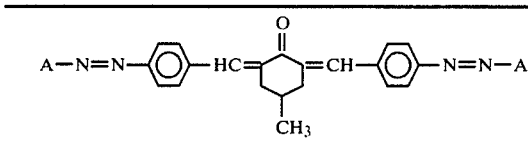

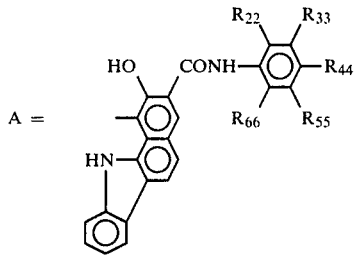

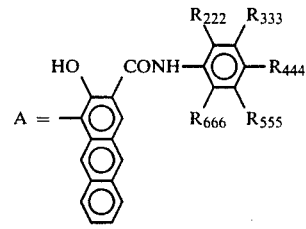

| Disazo Compound No. | $R_{22}$ | $R_{33}$ | $R_{44}$ | $R_{55}$ | $R_{66}$ |
|---|---|---|---|---|---|
| 121 | H | H | H | H | H |
| 122 | $NO_2$ | H | H | H | H |
| 123 | H | $NO_2$ | H | H | H |
| 124 | H | H | $NO_2$ | H | H |
| 125 | Cl | H | H | H | H |
| 126 | H | Cl | H | H | H |
| 127 | H | H | Cl | H | H |
| 128 | $CH_3$ | H | H | H | H |
| 129 | H | $CH_3$ | H | H | H |
| 130 | H | H | $CH_3$ | H | H |
| 131 | $C_2H_5$ | H | H | H | H |
| 132 | H | H | $C_2H_5$ | H | H |
| 133 | $OCH_3$ | H | H | H | H |
| 134 | H | $OCH_3$ | H | H | H |
| 135 | H | H | $OCH_3$ | H | H |
| 136 | $OC_2H_5$ | H | H | H | H |
| 137 | H | H | $OC_2H_5$ | H | H |
| 138 | $CH_3$ | H | $OCH_3$ | H | H |
| 139 | $CH_3$ | H | $CH_3$ | H | H |
| 140 | $CH_3$ | H | H | $CH_3$ | H |
| 141 | $CH_3$ | H | H | H | $CH_3$ |
| 142 | $OCH_3$ | H | $OCH_3$ | H | H |
| 143 | $OCH_3$ | H | H | $OCH_3$ | H |
| 144 | H | $OCH_3$ | H | $OCH_3$ | H |
| 145 | $CH_3$ | Cl | H | H | H |
| 146 | $CH_3$ | H | Cl | H | H |
| 147 | $CH_3$ | H | H | Cl | H |

| Disazo Compound No. | $R_{222}$ | $R_{333}$ | $R_{444}$ | $R_{555}$ | $R_{666}$ |
|---|---|---|---|---|---|
| 148 | H | H | H | H | H |
| 149 | $NO_2$ | H | H | H | H |
| 150 | H | $NO_2$ | H | H | H |
| 151 | H | H | $NO_2$ | H | H |
| 152 | Cl | H | H | H | H |
| 153 | H | Cl | H | H | H |
| 154 | H | H | Cl | H | H |
| 155 | $CH_3$ | H | H | H | H |
| 156 | H | $CH_3$ | H | H | H |
| 157 | H | H | $CH_3$ | H | H |
| 158 | $OCH_3$ | H | H | H | H |
| 159 | H | $OCH_3$ | H | H | H |
| 160 | H | H | $OCH_3$ | H | H |
| 161 | $CH_3$ | H | $OCH_3$ | H | H |
| 162 | $OCH_3$ | H | Cl | $CH_3$ | H |
| 163 | $CH_3$ | H | H | H | $CH_3$ |

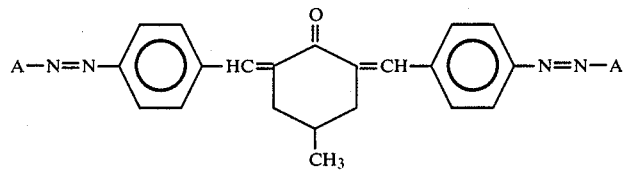

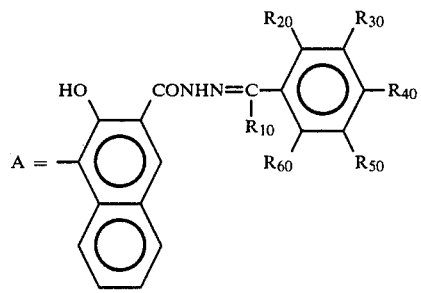

| Disazo Compound No. | $R_{10}$ | $R_{20}$ | $R_{30}$ | $R_{40}$ | $R_{50}$ | $R_{60}$ |
|---|---|---|---|---|---|---|

-continued

| No. | | | | | | |
|-----|---|---|---|---|---|---|
| 164 | H | H | H | H | H | H |
| 165 | H | NO₂ | H | H | H | H |
| 166 | H | H | NO₂ | H | H | H |
| 167 | H | H | H | NO₂ | H | H |
| 168 | H | Cl | H | H | H | H |
| 169 | H | H | Cl | H | H | H |
| 170 | H | H | H | Cl | H | H |
| 171 | H | CH₃ | H | H | H | H |
| 172 | H | H | CH₃ | H | H | H |
| 173 | H | H | H | CH₃ | H | H |
| 174 | H | OCH₃ | H | H | H | H |
| 175 | H | H | OCH₃ | H | H | H |
| 176 | H | H | H | OCH₃ | H | H |
| 177 | H | H | H | N(CH₃)₂ | H | H |
| 178 | H | F | H | H | H | H |
| 179 | H | H | F | H | H | H |
| 180 | H | H | H | F | H | H |
| 181 | H | Br | H | H | H | H |
| 182 | H | H | Br | H | H | H |
| 183 | H | H | H | Br | H | H |
| 184 | H | Cl | H | Cl | H | H |
| 185 | H | H | Cl | Cl | H | H |
| 186 | H | CN | H | H | H | H |
| 187 | H | H | H | CN | H | H |
| 188 | H | CH₃ | H | CH₃ | H | H |
| 189 | H | OCH₃ | H | H | OCH₃ | H |
| 190 | H | OCH₃ | OCH₃ | OCH₃ | H | H |
| 191 | H | CH₃ | H | H | H | CH₃ |
| 192 | CH₃ | H | H | H | H | H |
| 193 | —CH₂—C₆H₅ | H | H | H | H | H |
| 194 | —C₆H₅ | H | H | H | H | H |
| 195 | H | H | H | H | —N(C₆H₅)₂ | H |

$$A-N=N-\underset{}{\bigcirc}-HC=\underset{CH_3}{\overset{O}{\underset{||}{C}}}=CH-\underset{}{\bigcirc}-N=N-A$$

$$A = \underset{\text{(naphthyl)}}{\overset{HO}{\underset{}{\bigcirc\bigcirc}}}-CONHN=\underset{R_9}{\overset{R_8}{C}}$$

| Disazo Compound No. | R₈ | R₉ |
|---|---|---|
| 196 | CH₃ | CH₃ |
| 197 | H | —CH=CH—C₆H₅ |
| 198 | H | —C(CH₃)=CH—C₆H₅ |
| 199 | H | (furyl) |
| 200 | H | (pyridyl) |
| 201 | H | (thienyl) |
| 202 | CH₃ | (methylthienyl) |

-continued

| No. | | X |
|---|---|---|
| 203 | H | (1-naphthyl) |
| 204 | H | (anthracenyl) |
| 205 | H | (pyrenyl) |
| 206 | H | (9-ethylcarbazolyl) |
| 207 | H | (pyridyl) |

$$A-N{=}N-\phi-HC{=}\underset{\underset{CH_3}{\big|}}{C}(C{=}O){=}CH-\phi-N{=}N-A$$

$$A = \text{3-hydroxy-2-naphthyl-CONHN}{=}X_1$$

Disazo Compound

| No. | $X_1$ |
|---|---|
| 208 | =cyclohexyl, H |
| 209 | =fluorenyl |
| 210 | =(nitro-fluorenyl), NO$_2$ |

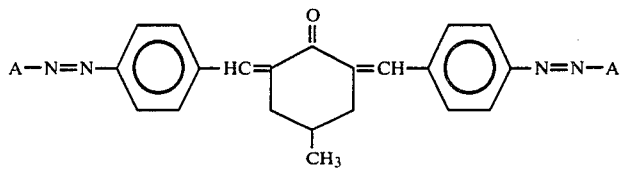
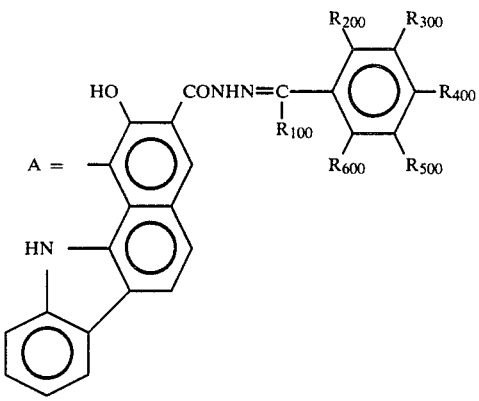
| Disazo Compound No. | R₁₀₀ | R₂₀₀ | R₃₀₀ | R₄₀₀ | R₅₀₀ | R₆₀₀ |
|---|---|---|---|---|---|---|
| 211 | H | H | H | H | H | H |
| 212 | H | NO₂ | H | H | H | H |
| 213 | H | H | NO₂ | H | H | H |
| 214 | H | H | H | NO₂ | H | H |
| 215 | H | Cl | H | H | H | H |
| 216 | H | H | Cl | H | H | H |
| 217 | H | H | H | Cl | H | H |
| 218 | H | CH₃ | H | H | H | H |
| 219 | H | H | CH₃ | H | H | H |
| 220 | H | H | H | CH₃ | H | H |
| 221 | H | OCH₃ | H | H | H | H |
| 222 | H | H | OCH₃ | H | H | H |
| 223 | H | H | H | OCH₃ | H | H |
| 224 | H | H | H | N(CH₃)₂ | H | H |
| 225 | H | F | H | H | H | H |
| 226 | H | H | F | H | H | H |
| 227 | H | H | H | F | H | H |
| 228 | H | Br | H | H | H | H |
| 229 | H | H | Br | H | H | H |
| 230 | H | H | H | Br | H | H |
| 231 | H | Cl | H | Cl | H | H |
| 232 | H | H | Cl | Cl | H | H |
| 233 | H | CN | H | H | H | H |
| 234 | H | H | H | CN | H | H |
| 235 | H | CH₃ | H | CH₃ | H | H |
| 236 | H | OCH₃ | H | H | OCH₃ | H |
| 237 | H | OCH₃ | OCH₃ | OCH₃ | H | H |
| 238 | H | CH₃ | H | H | H | CH₃ |
| 239 | CH₃ | H | H | H | H | H |
| 240 | —CH₂—⬡ | H | H | H | H | H |
| 241 | —⬡ | H | H | H | H | H |
| 242 | H | H | H | H | —N(—⬡)₂ | H |

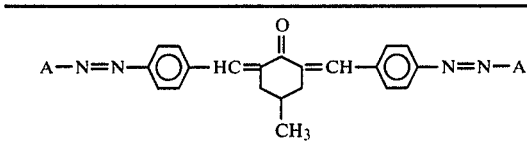
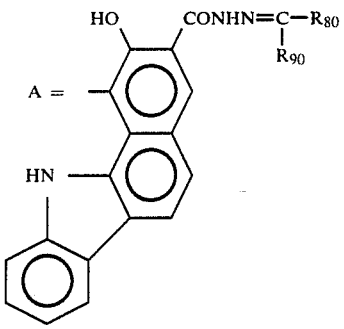
| Disazo Compound No. | $R_{80}$ | $R_{90}$ |
|---|---|---|
| 243 | $CH_3$ | $CH_3$ |
| 244 | H | $-CH=CH-\phi$ |
| 245 | H | $-CH=C(CH_3)-\phi$ |
| 246 | H | furyl |
| 247 | H | pyridyl |
| 248 | H | thienyl |
| 249 | $CH_3$ | methylthienyl |
| 250 | H | naphthyl |
| 251 | H | anthryl |
| 252 | H | pyrenyl |
-continued
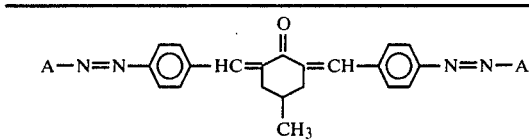
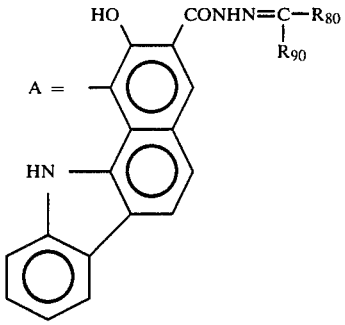
| Disazo Compound No. | $R_{80}$ | $R_{90}$ |
|---|---|---|
| 253 | H | N-ethylcarbazolyl |
| 254 | H | pyridyl |
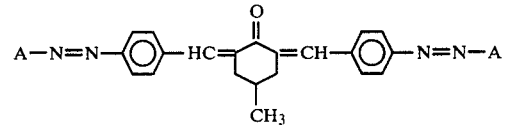
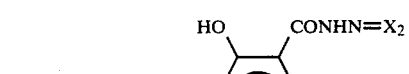
| Disazo Compound No. | $X_2$ |
|---|---|
| 255 | =cyclohexyl(H) |
| 256 | fluorenylidene |

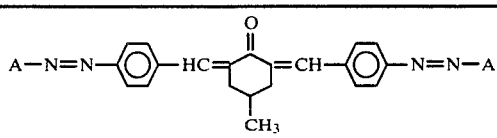

| Disazo Compound No. | $X_2$ |
|---|---|
| 257 | 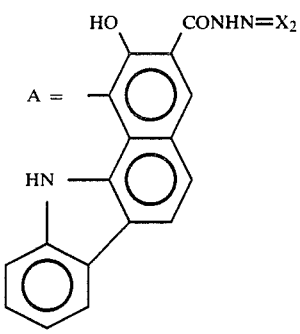 |

A method for preparing the disazo compound of the present invention is illustrated hereinafter in detail.

The diazotization of the diamino compound having the above chemical formula (II), that is, 2,6-di(4-amino benzylidene)-4-methyl cyclohexanone prepared by reducing 2,6-di(4-nitrobenzylidene)-4-methyl cyclohexanone, is carried out in an inorganic acid such as hydrochloric acid or sulfuric acid by adding sodium nitrite at $-10°$ C. to $50°$ C. This diazotization is completed in 30 minutes to 3 hours. To the reaction mixture, is added borofluoric acid, sodium borofluoride aqueous solution or the like to precipitate as a tetrazonium salt. The precipitated crystal is preferably filtered out to be used in a succeeding reaction. The tetrazonium salt thus obtained is subjected to a coupling reaction with a coupler having the general formulas (IV), (V) or (VI). From the stoichiometrical view point, one mole of a tetrazonium salt is reacted with two moles of a coupler, but from practical view point, 1.5-4 moles, preferably 2-3 moles of the coupler is supplied to one mole of the tetrazonium salt when taking manufacturing cost and the purity of pigment obtained into consideration. In practice, this reaction is carried out by dissolving a mixture of the tetrazonium salt and coupler in an organic solvent such as N,N-dimethylformamide (DMF), dimethylsulfoxide or the like, and adding drop-wise an alkaline aqueous solution to the reaction solution such as sodium acetate aqueous solution at about $-10°$ C. to $40°$ C. This reaction is completed in about 5 minutes to 3 hours. After the completion of the reaction, the precipitated crystal is filtered out and is finally purified by an appropriate method (for example by washing, recrystalizing or the like with water and/or organic solvent).

The novel disazo compound prepared in accordance with the present invention as mentioned above, is a colored crystal at normal temperature. Examples of the novel disazo compound of the present invention are listed in the following Table 1 and 2, together with various datas including melting point, elemental analysis and infrared absorption spectrum.

TABLE 1

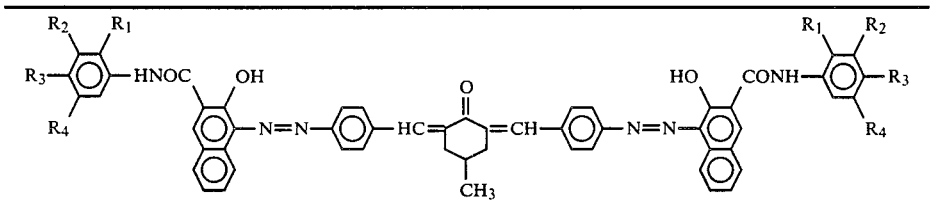

Figure 2:
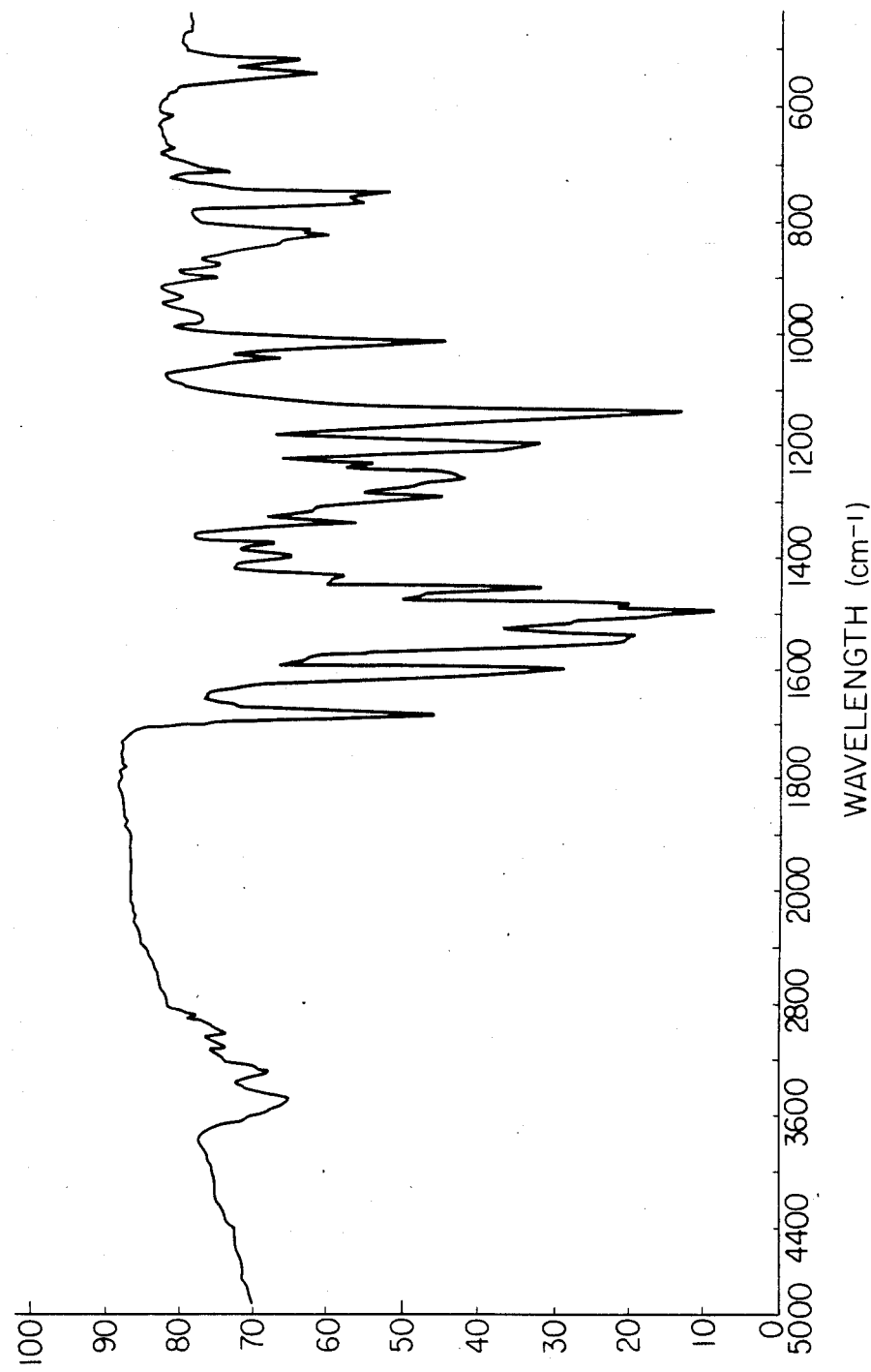
Figure 3:
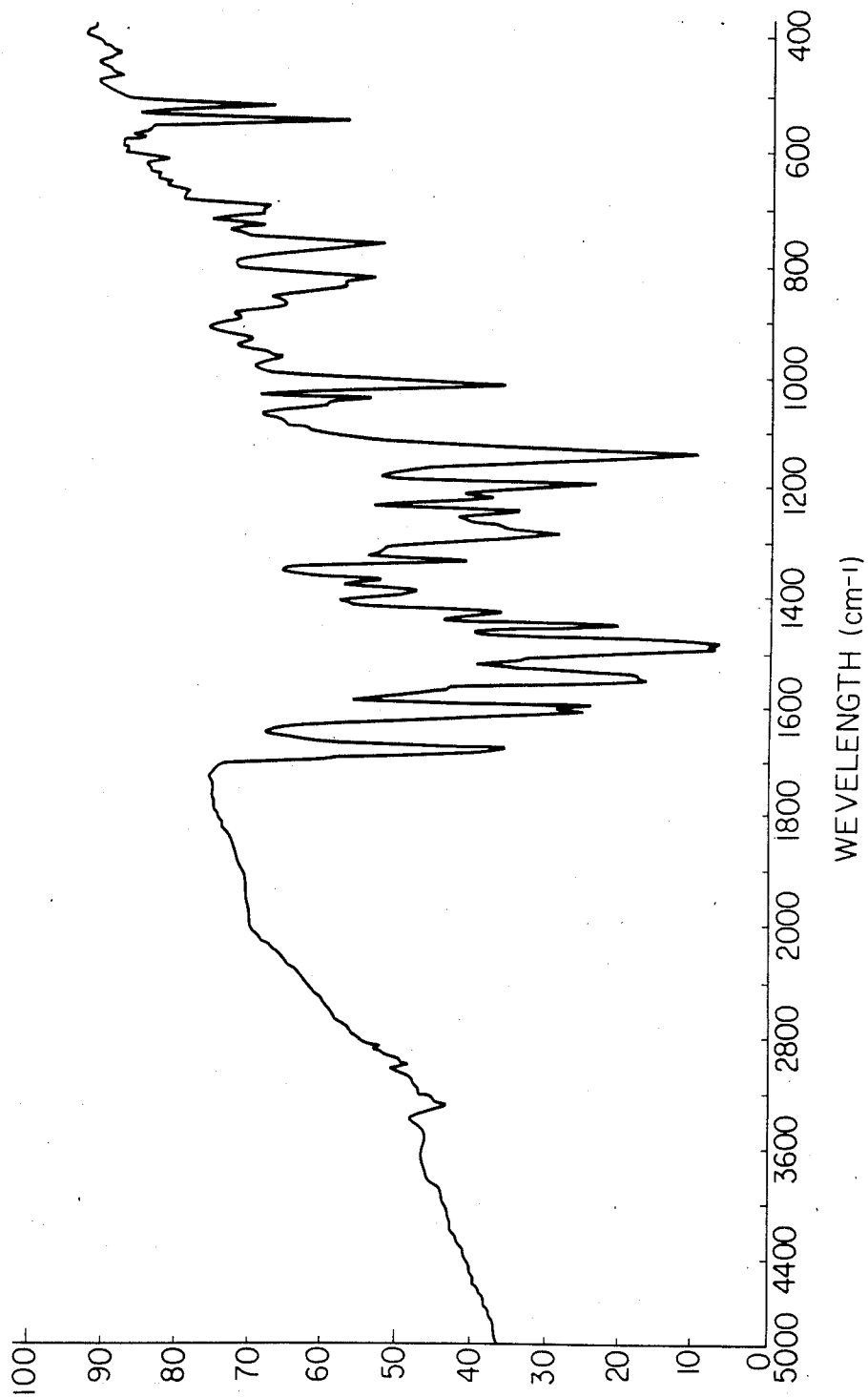
Figure 4:
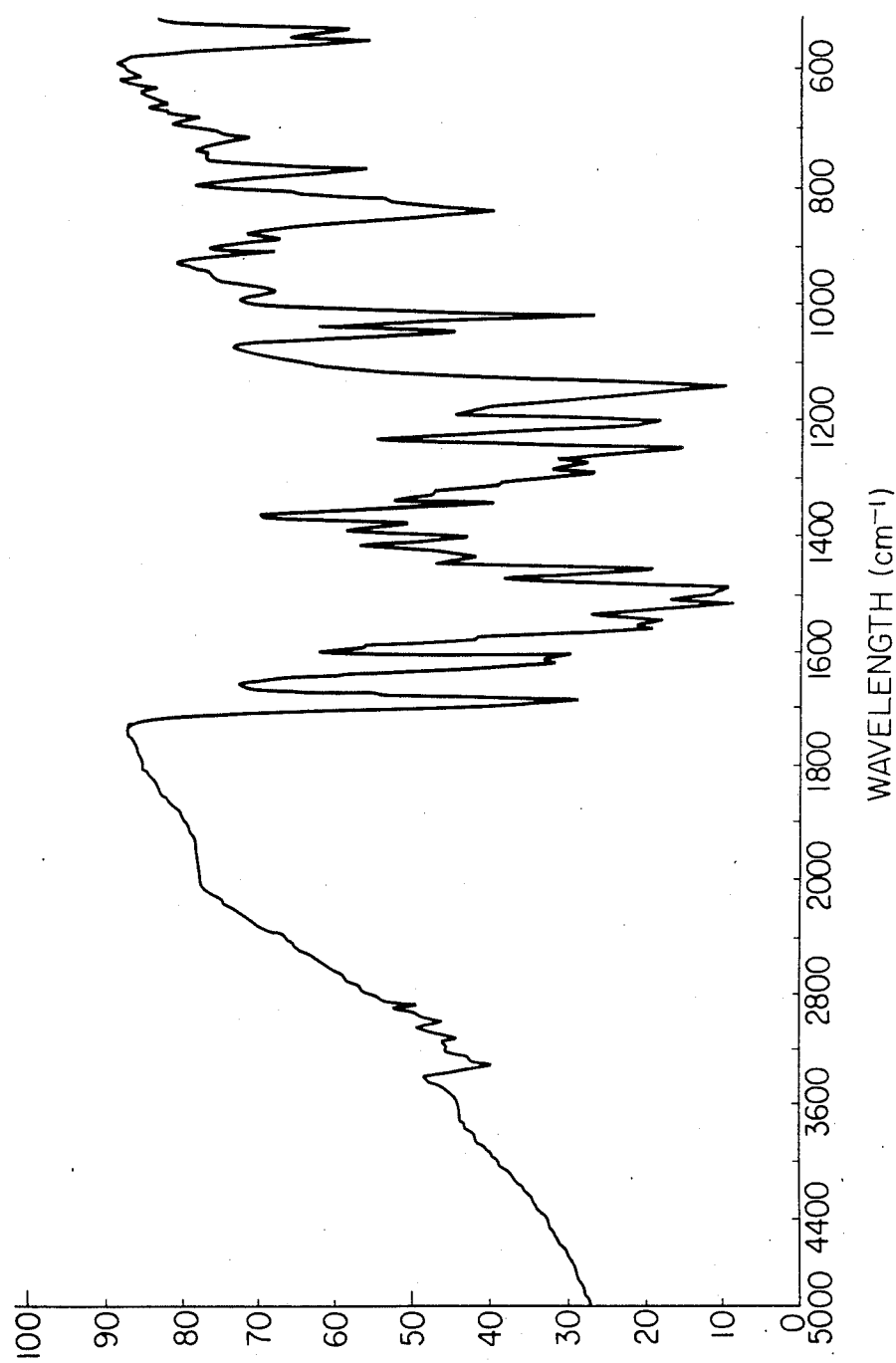
Figure 5:
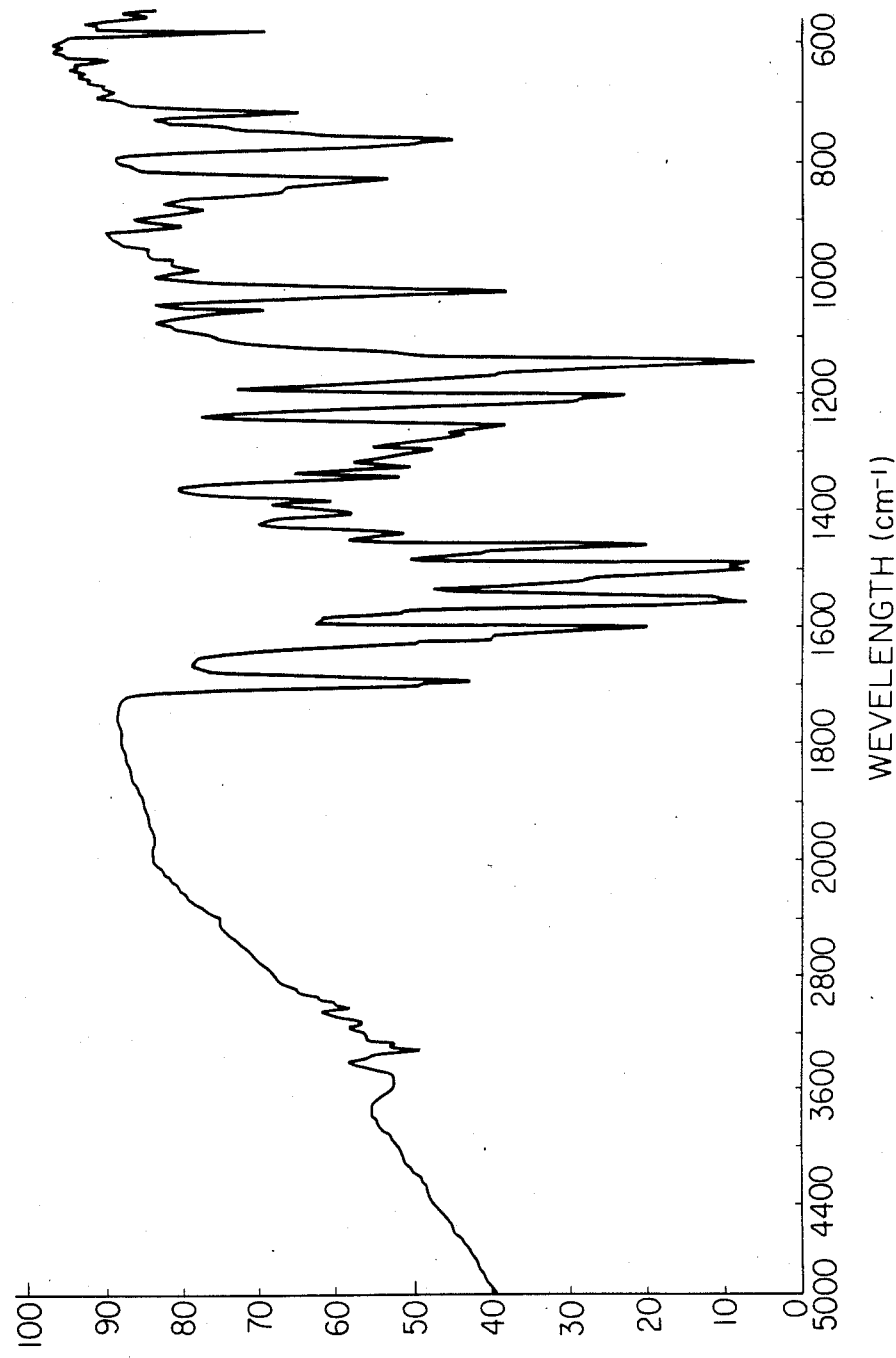
Figure 6:
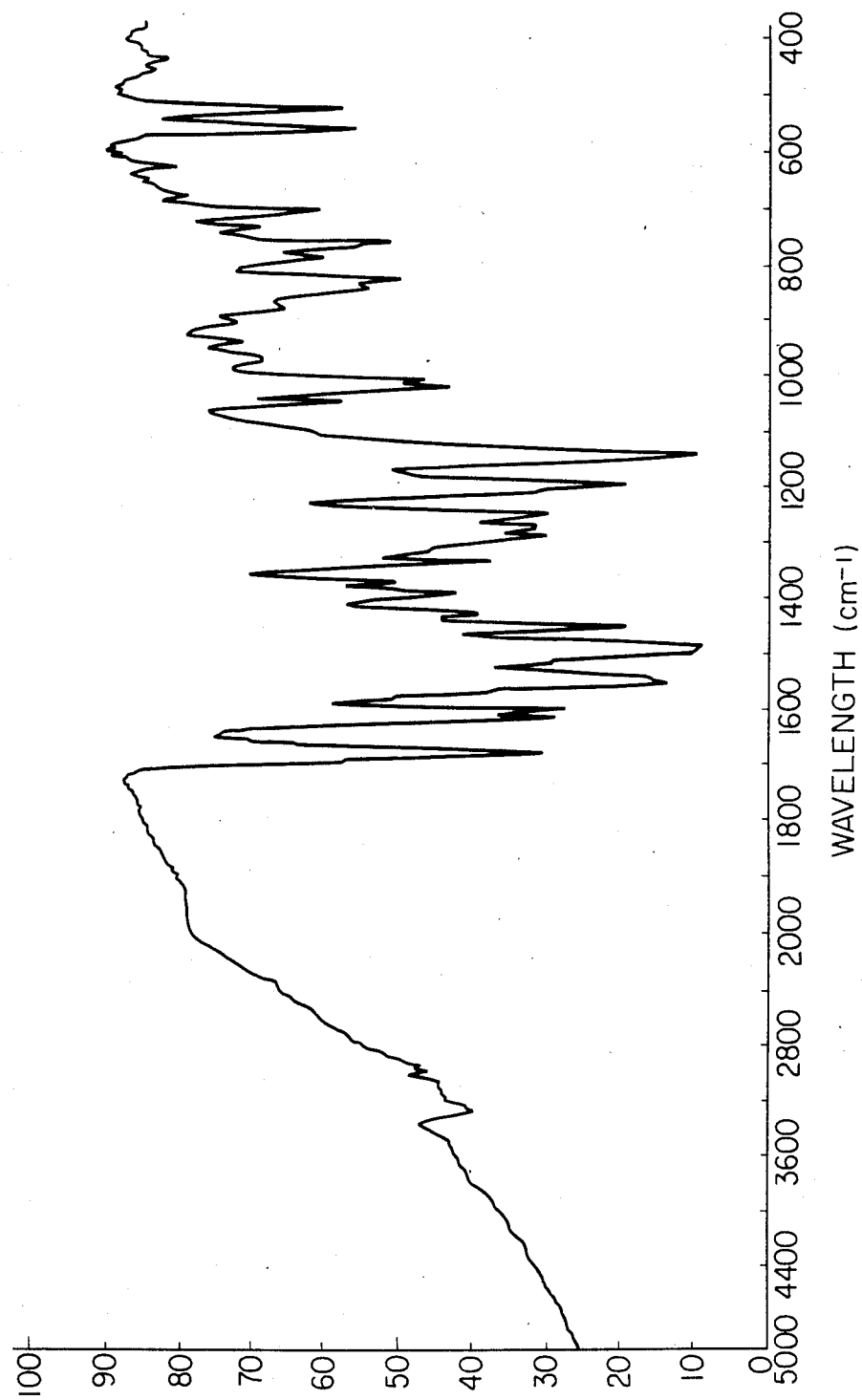
Figure 7:
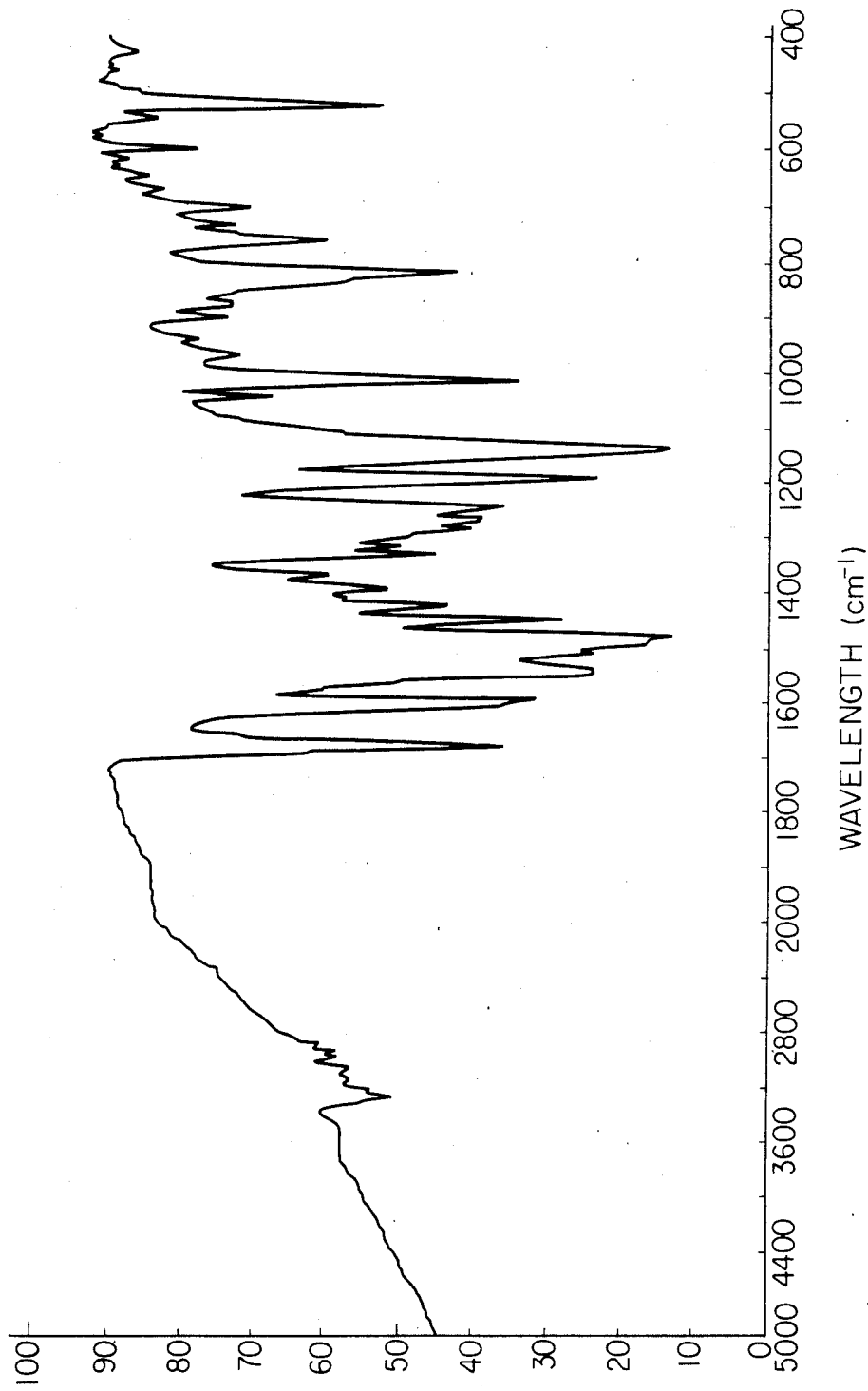
Figure 8:
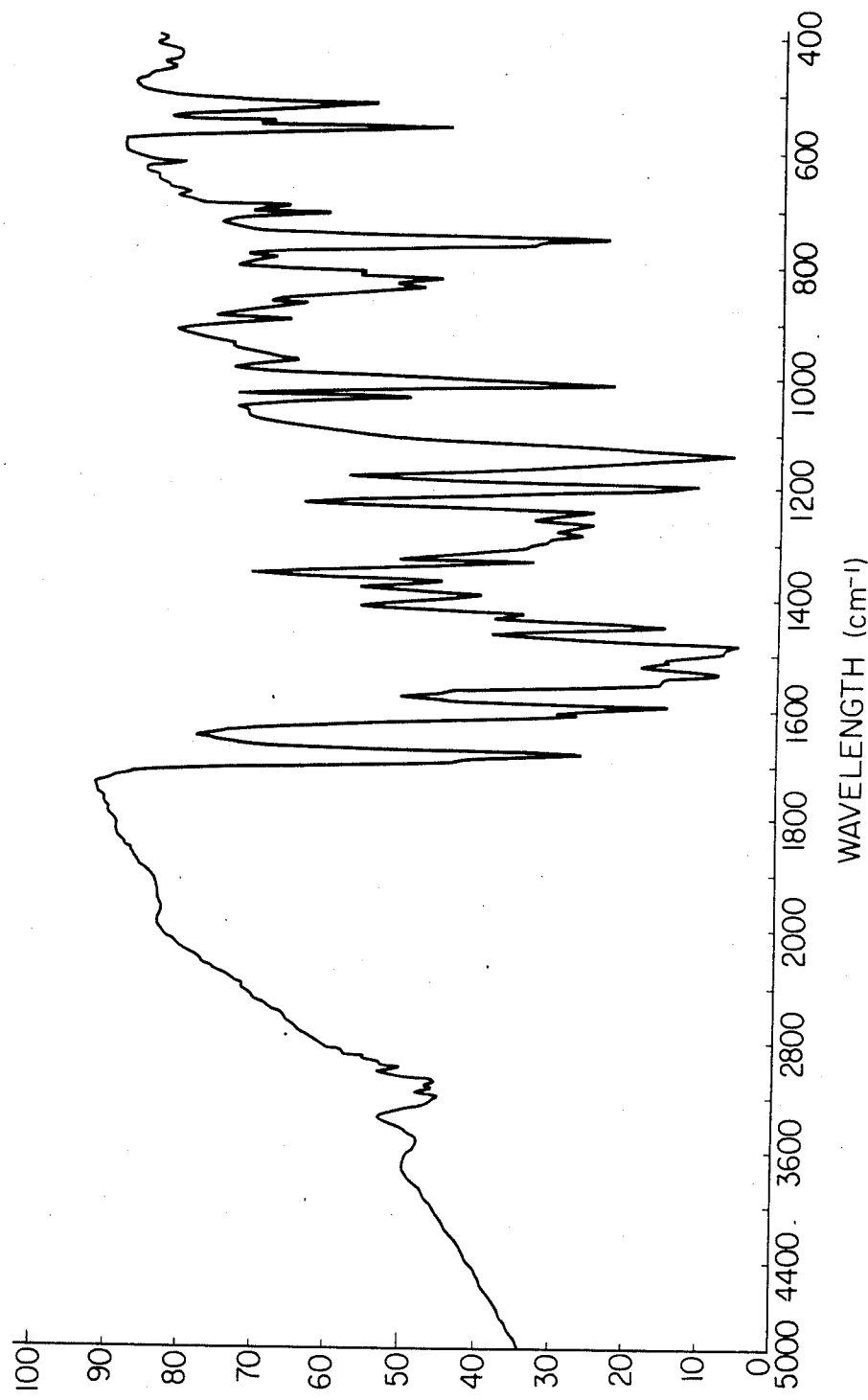
Figure 9:
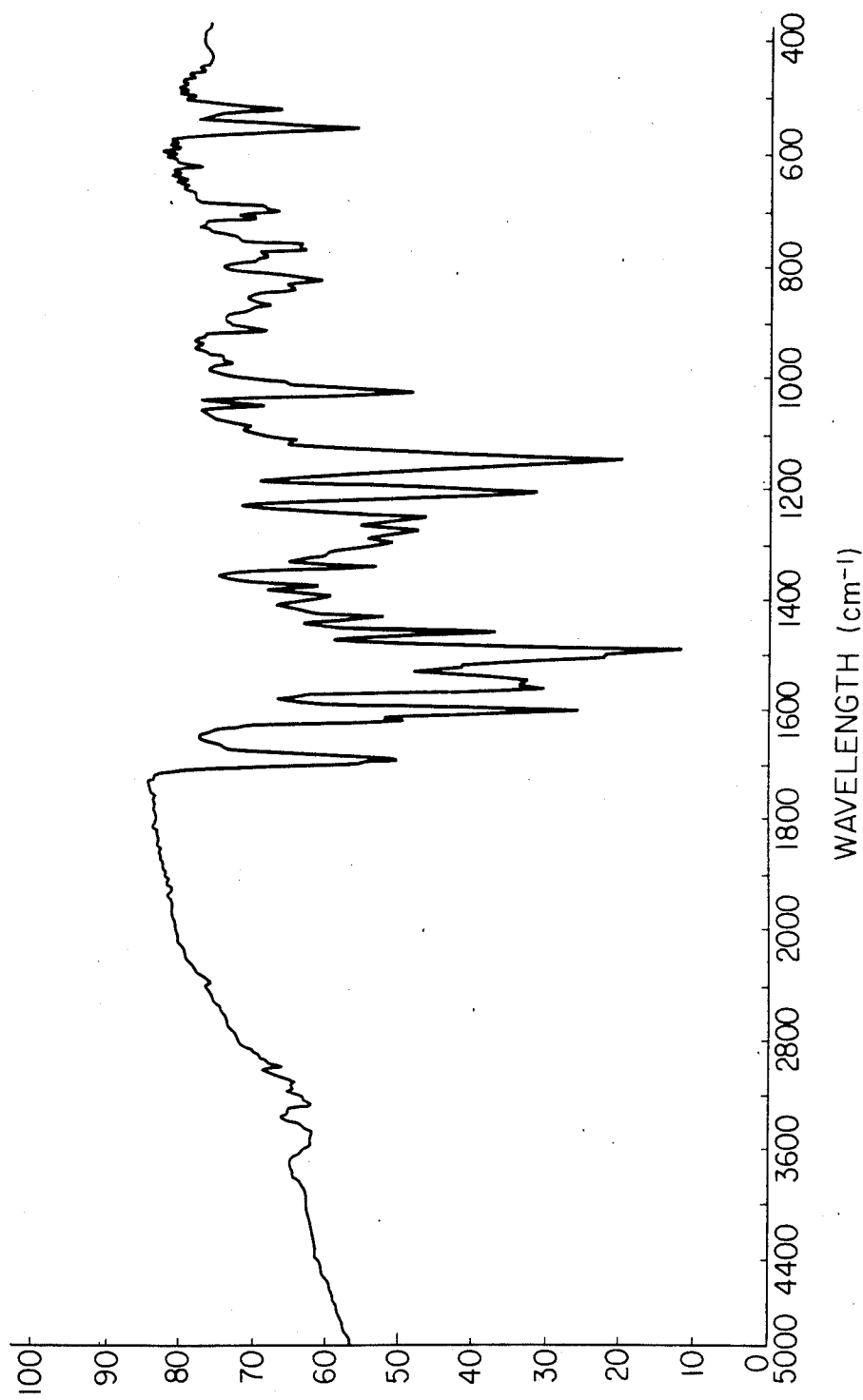
Figure 10:
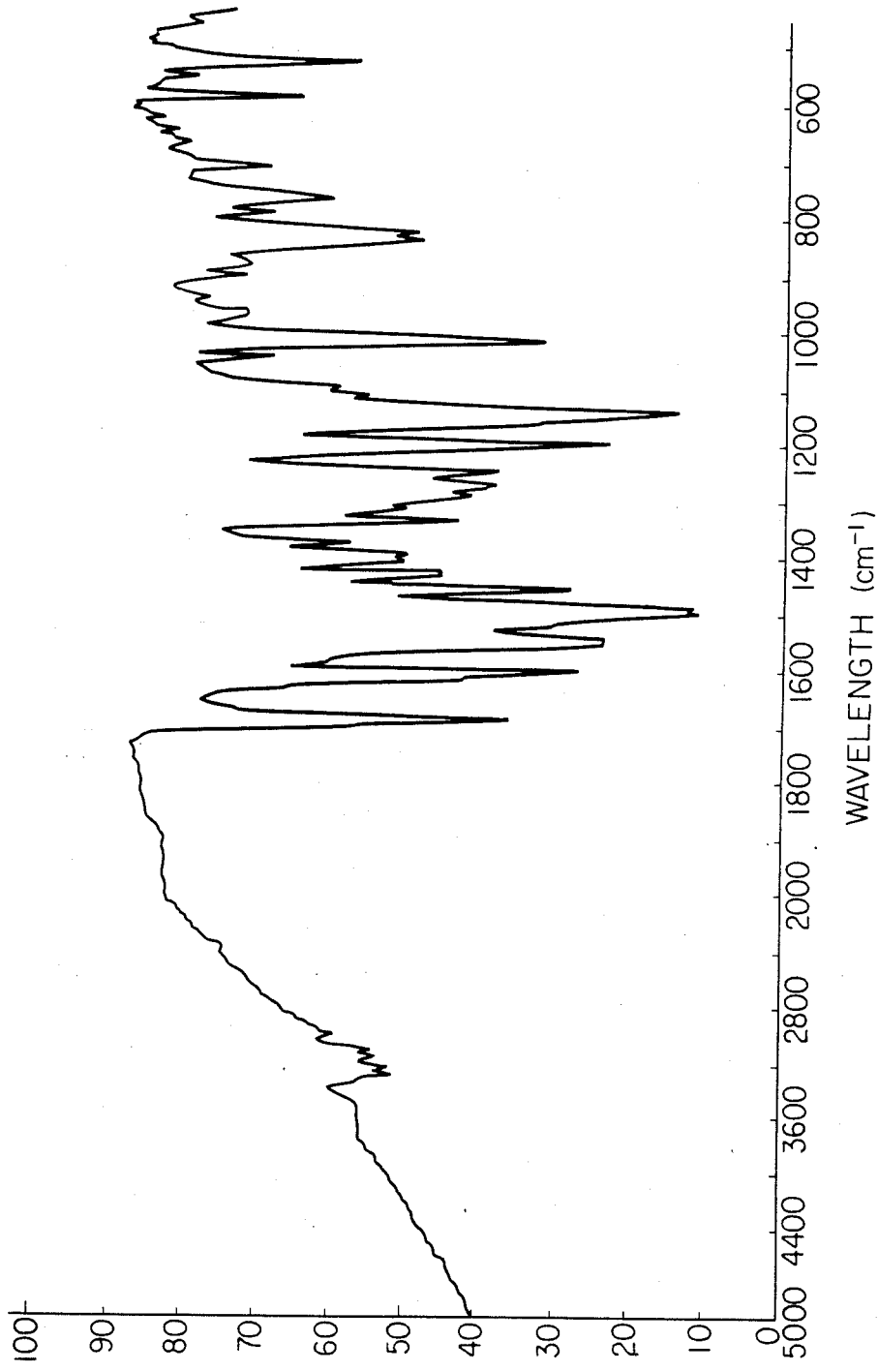
Figure 11:
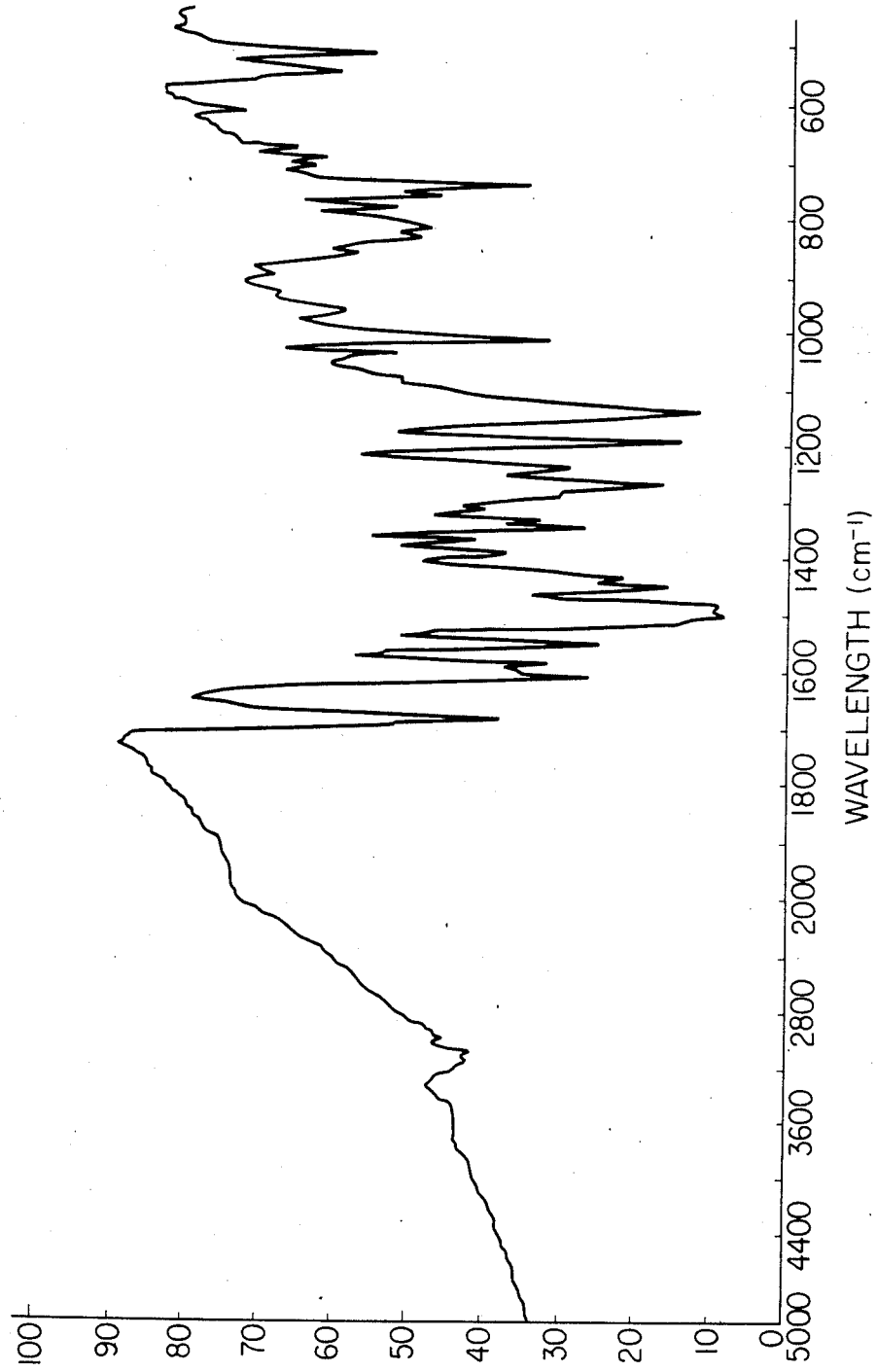
Figure 12:
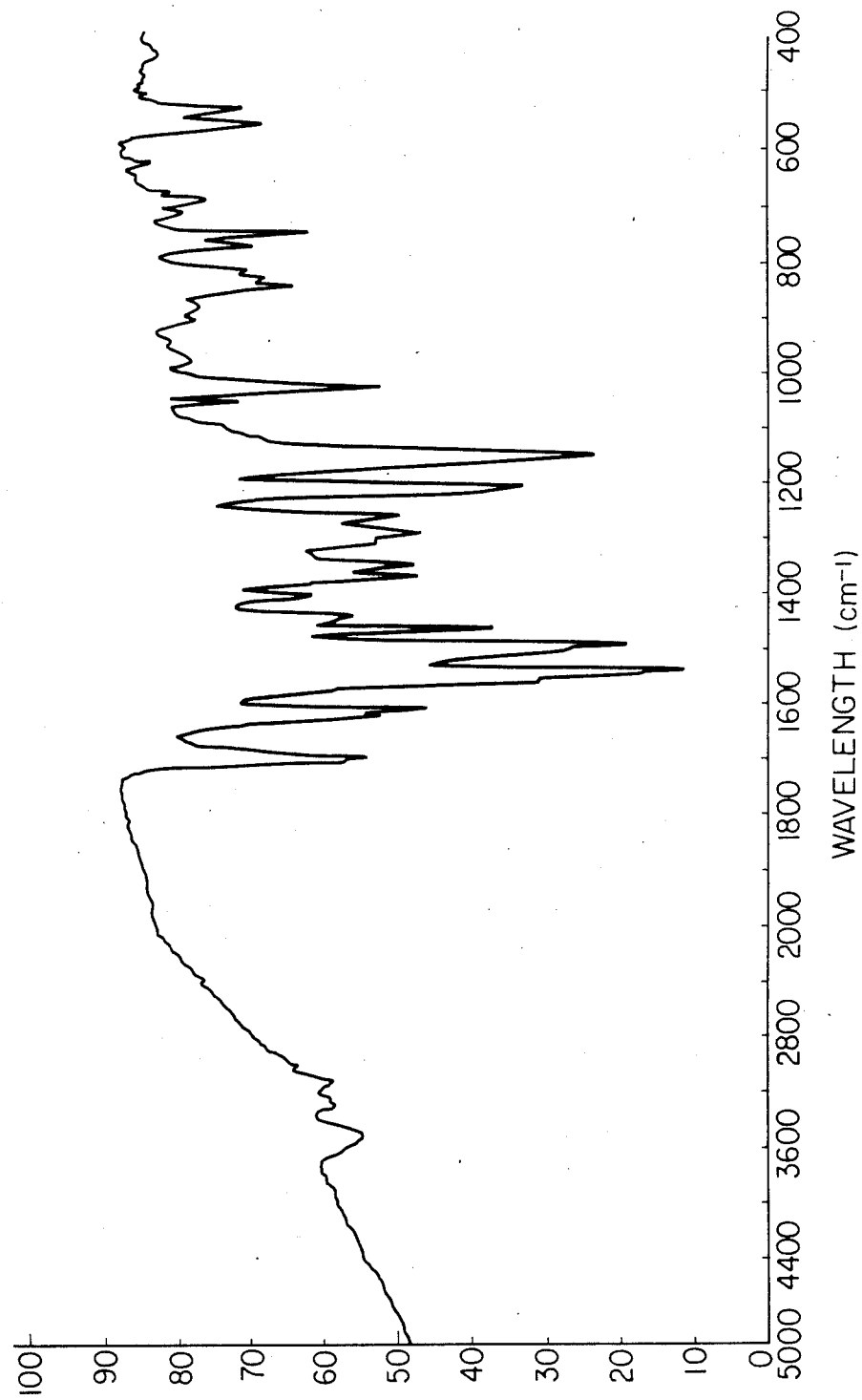

| Disazo Compound No. | $R_1$ | $R_2$ | $R_3$ | $R_4$ | Elemental Analysis (Calculated Value) | | | Decomposition Point (°C.) | Infrared Absorption Spectrum (KBr Disk) |
|---|---|---|---|---|---|---|---|---|---|
| | | | | | C % | H % | N % | | |
| 1 | H | H | H | H | 75.98 (76.28) | 4.67 (4.79) | 9.53 (9.71) | 286 | FIG. 1 |
| 28 | OCH$_3$ | H | H | H | 73.47 (73.85) | 4.95 (5.00) | 8.83 (9.07) | 286 | FIG. 2 |
| 29 | H | OCH$_3$ | H | H | 73.35 (73.85) | 4.83 (5.00) | 8.89 (9.07) | 284 | FIG. 3 |
| 30 | H | H | OCH$_3$ | H | 73.63 (73.85) | 5.04 (5.00) | 8.97 (9.07) | 274 | FIG. 4 |
| 23 | CH$_3$ | H | H | H | 76.26 (76.49) | 5.16 (5.18) | 9.20 (9.39) | 270 | FIG. 5 |
| 24 | H | CH$_3$ | H | H | 76.31 (76.49) | 5.09 (5.18) | 9.35 (9.39) | 270 | FIG. 6 |
| 25 | H | H | CH$_3$ | H | 76.74 (76.49) | 5.07 (5.18) | 9.32 (9.39) | 268 | FIG. 7 |
| 17 | Cl | H | H | H | 70.17 (70.66) | 4.45 (4.21) | 8.68 (8.99) | 268 | FIG. 8 |
| 18 | H | Cl | H | H | 70.42 (70.66) | 4.13 (4.21) | 8.76 (8.99) | 290 | FIG. 9 |
| 19 | H | H | Cl | H | 70.40 (70.66) | 4.12 (4.21) | 8.81 (8.99) | 282 | FIG. 10 |
| 2 | NO$_2$ | H | H | H | 68.88 (69.03) | 4.13 (4.21) | 11.31 (11.75) | 308 | FIG. 11 |
| 3 | H | NO$_2$ | H | H | 69.20 | 4.10 | 11.61 | 280 | FIG. 12 |

TABLE 1-continued

[Structure: R2,R1,R3,R4-substituted phenyl—HNOC—(naphthol with OH)—N=N—phenyl—HC=C(cyclohexanone with CH3)=CH—phenyl—N=N—(naphthol with HO)—CONH—phenyl(R1,R2,R3,R4)]

Figure 13:
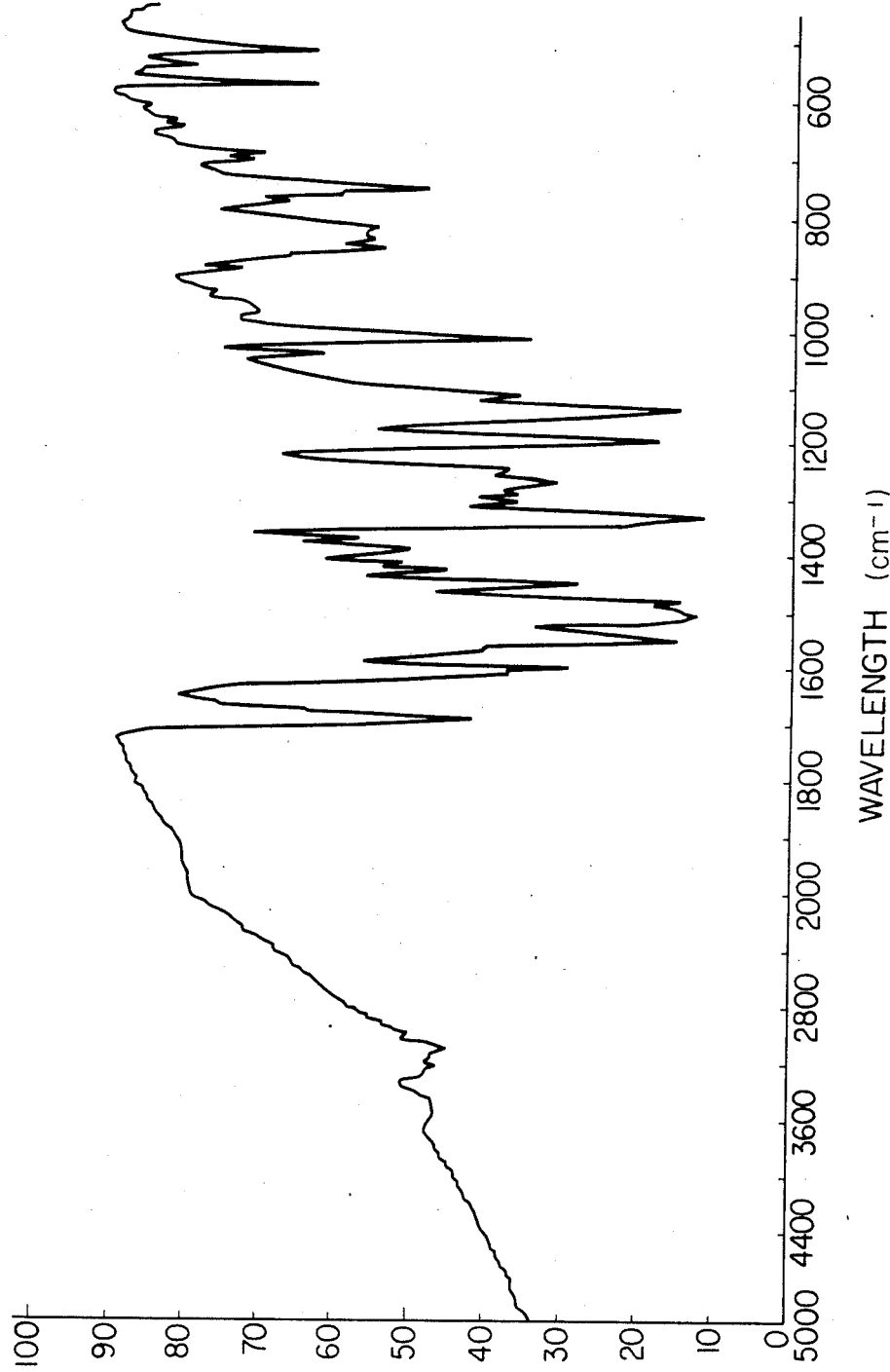

| Disazo Compound No. | $R_1$ | $R_2$ | $R_3$ | $R_4$ | Elemental Analysis (Calculated Value) | | | Decomposition Point (°C.) | Infrared Absorption Spectrum (KBr Disk) |
|---|---|---|---|---|---|---|---|---|---|
| | | | | | C % | H % | N % | | |
| 4 | H | H | $NO_2$ | H | (69.03) 69.20 (69.03) | (4.21) 4.39 (4.21) | (11.75) 11.30 (11.75) | 286 | FIG. 13 |

TABLE 2

[Structure: Ar—N=N—phenyl—HC=C(cyclohexanone with CH3)=CH—phenyl—N=N—Ar]

Figure 14:
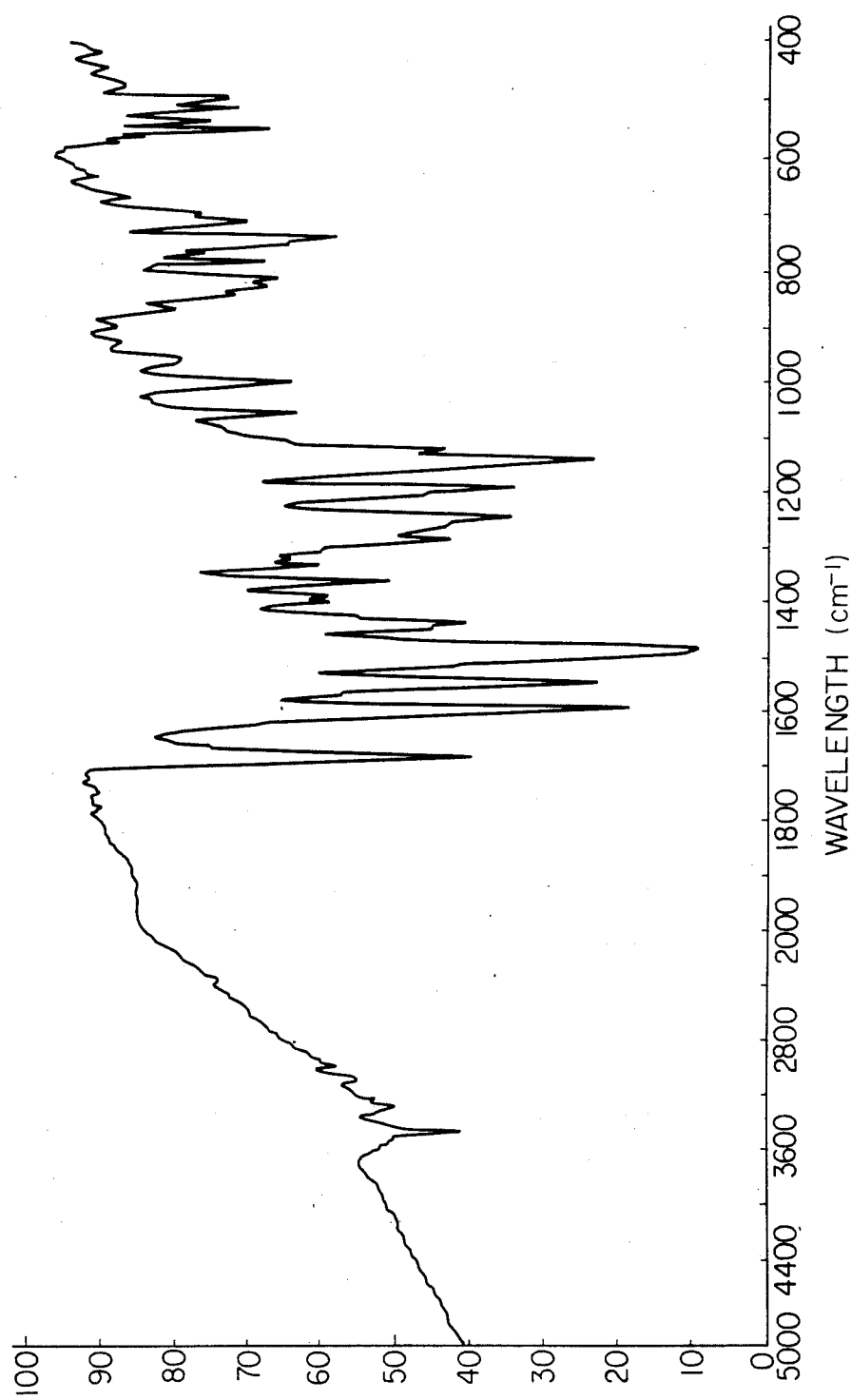
Figure 15:
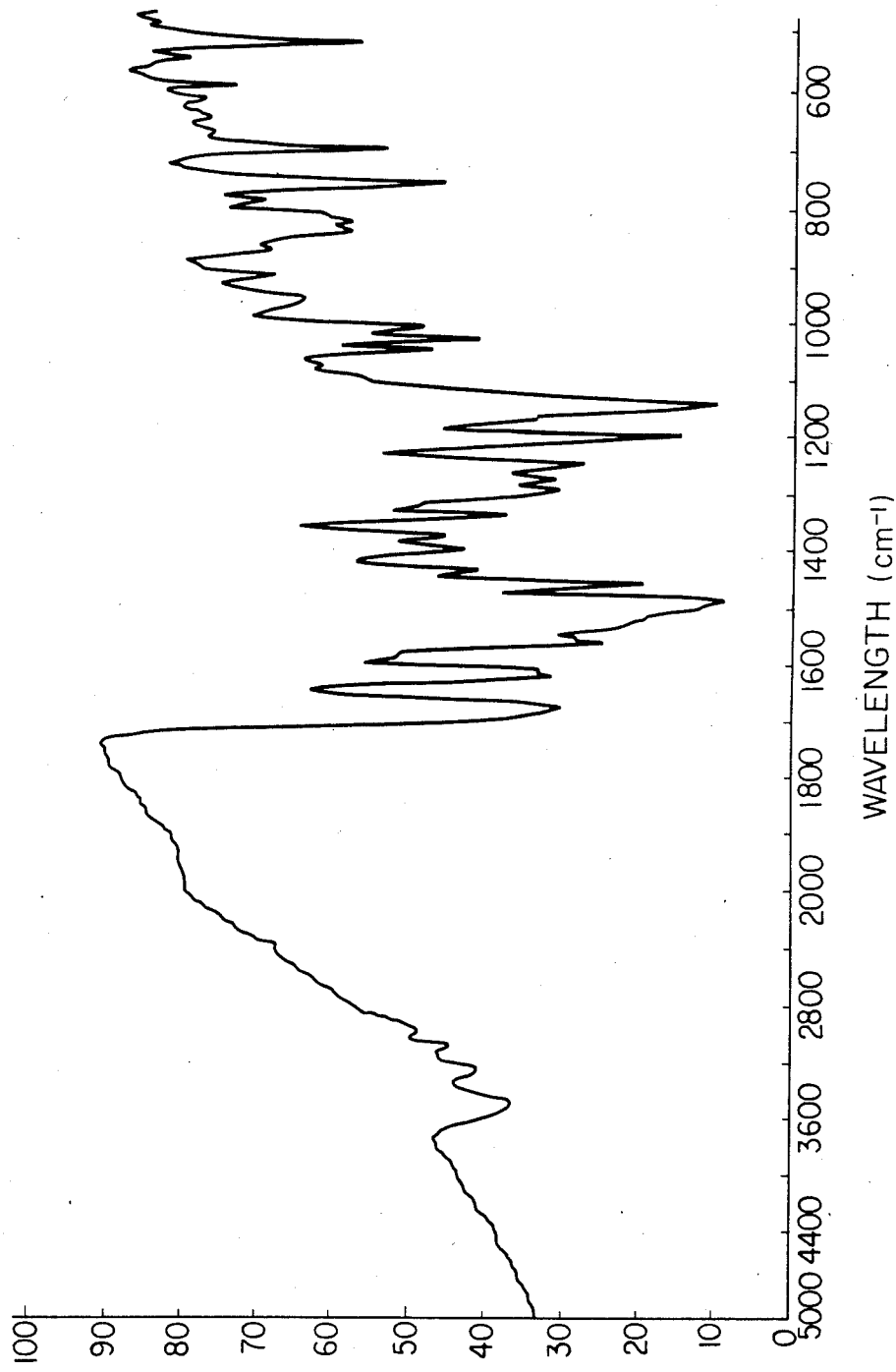
Figure 16:
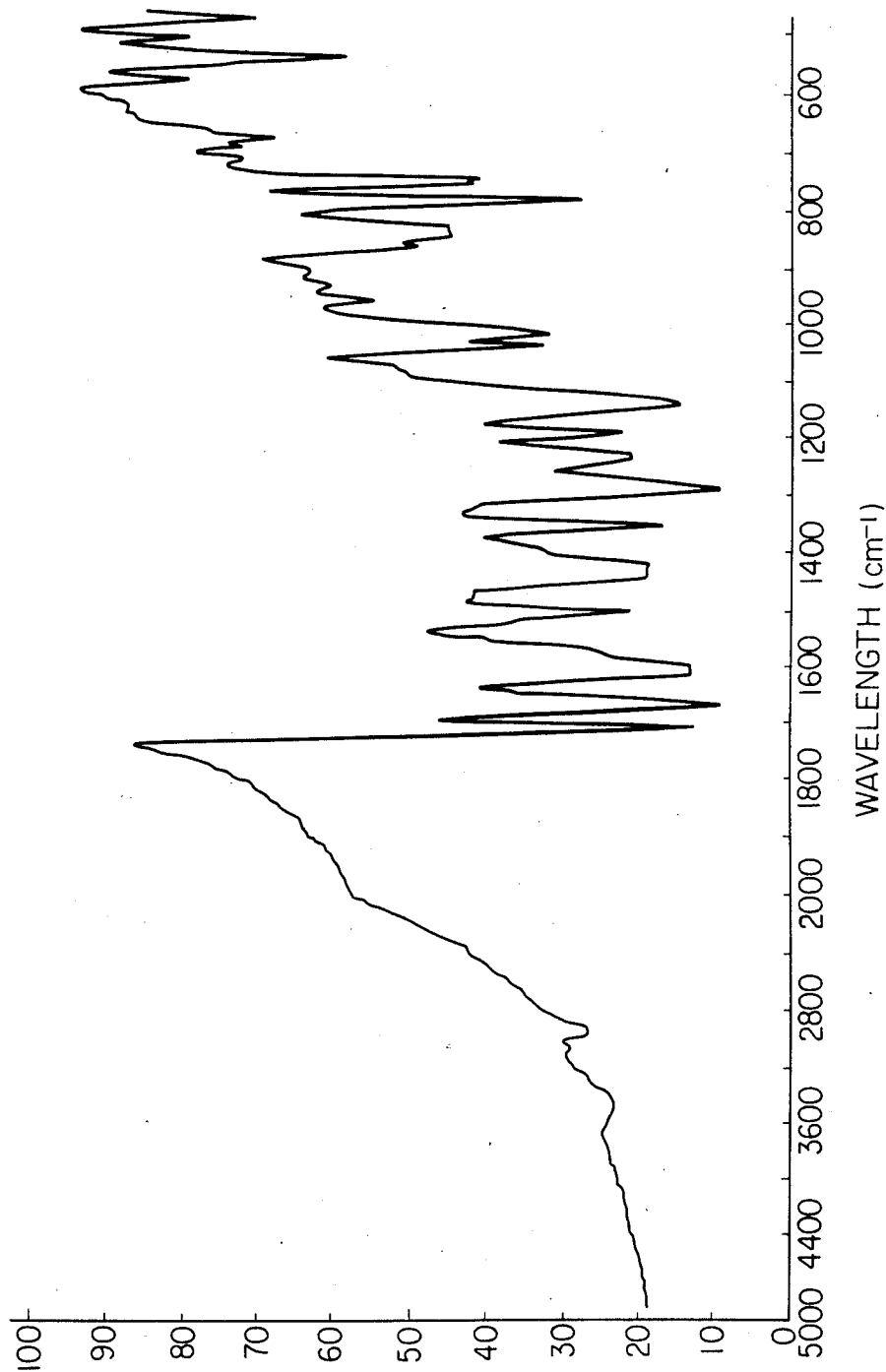

| Disazo Compound No. | Ar | Elemental Analysis (Calculated Value) | | | Decomposition Point (°C.) | Infrared Absorption Spectrum (KBr Disk) |
|---|---|---|---|---|---|---|
| | | C % | H % | N % | | |
| 121 | [HO, CONH-phenyl substituted naphthol with HN-indole fused ring] | 77.09 (76.99) | 4.60 (4.63) | 10.64 (10.72) | 322 | FIG. 14 |
| 164 | [HO, CONHN=CH-phenyl substituted naphthol] | 74.31 (74.33) | 4.79 (4.81) | 12.20 (12.17) | 268 | FIG. 15 |
| 71 | [HO-naphthol with fused imide ring N—CH3] | 71.02 (71.03) | 4.27 (4.31) | 10.43 (10.56) | 294 | FIG. 16 |

The preparation examples of the novel disazo compound of the present invention are illustrated hereinafter.

Preparation of Tetrazonium Salt

Sodium nitrite aqueous solution prepared by dissolving 7.47 g (0.105 mole) of 97% sodium nitrite in 30 ml of water was added drop-wise at a temperature of 0°–5° C. to a mixture of 2,6-bis(4-aminobenzylidene)-4-methylcyclohexanone 15.9 g (0.05 mole), 36% hydrochloric acid 100 ml and water 100 ml, and the resultant mixture was stirred at the same temperature for 1 hour. The solution thus obtained was filtered to removed undissolved portion (minute amount), and 42% borofluoric acid was added to the resultant filtrate to obtain a crystal. The precipitated crystal was filtered out, and the crystal was subjected to washing with water, washing with methanol and drying, thus obtaining a tetrazonium salt. The yield was 21.5 g (83.5%).

The infrared absorption spectrum (KBr Disk) was as follows:

$\nu N_2^\oplus$     $2260 \, cm^{-1}$ $\nu C=O$     $1670 \, cm^{-1}$

Preparation of Disazo Compound No. 1

1.29 g of the tetrazonium salt thus obtained and 1.32 g of 2-hydroxy-3-naphthoic acid anilide as a coupler were dissolved in 150 ml of cooled N,N-dimethylformamide. To this solution, was added drop-wise a solution comprising sodium acetate 0.82 g and water 7 ml at a temperature of 5°–10° C. for 20 minutes. Thereafter, the resultant mixture was stirred for 3 hours at room temperature. The produced precipitate was filtered out, and was washed for 3 times with N,N-dimethylformamide 200 ml heated to 80° C. and further with water 200 ml for 2 times. The washed precipitate was dried at 80° C. under a reduced pressure of 2 mm Hg, thus obtaining 1.41 g (yield=65.0%) of the above disazo compound No. 1 shown in Table 1.

The appearance of disazo compound thus obtained was purplish red powder, the infrared absorption spectrum (KBr Disk) of which is shown in FIG. 1.

Preparation Examples 2 to 16

The same procedure as in the above Preparation Example 1 was repeated, except that compounds as mentioned in the following Table 3 were used as a coupler to prepare the disazo compounds shown in Tables 1 and 2. The results are shown in Table 3.

TABLE 3

| Example No. | Disazo Compound No. | Coupling Component | Yield (%) | Appearance |
|---|---|---|---|---|
| 2 | 28 | 2-hydroxy-3-naphthoic acid (2-methoxyphenyl)amide | 78.9 | purplish red |
| 3 | 29 | 2-hydroxy-3-naphthoic acid (3-methoxyphenyl)amide | 65.1 | purplish red |
| 4 | 30 | 2-hydroxy-3-naphthoic acid (4-methoxyphenyl)amide | 68.5 | purplish red |

TABLE 3-continued

| Example No. | Disazo Compound No. | Coupling Component | Yield (%) | Appearance |
|---|---|---|---|---|
| 5 | 23 | 3-hydroxy-2-naphthoic acid 2-methylanilide | 68.3 | purplish red |
| 6 | 24 | 3-hydroxy-2-naphthoic acid 3-methylanilide | 70.5 | purplish red |
| 7 | 25 | 3-hydroxy-2-naphthoic acid 4-methylanilide | 67.0 | purplish red |
| 8 | 17 | 3-hydroxy-2-naphthoic acid 2-chloroanilide | 82.1 | red |
| 9 | 18 | 3-hydroxy-2-naphthoic acid 3-chloroanilide | 66.7 | purplish red |

TABLE 3-continued

| Example No. | Disazo Compound No. | Coupling Component | Yield (%) | Appearance |
|---|---|---|---|---|
| 10 | 19 | 3-hydroxy-2-naphthoic acid 4-chloroanilide | 71.8 | purplish red |
| 11 | 2 | 3-hydroxy-2-naphthoic acid 2-nitroanilide | 70.7 | purple |
| 12 | 3 | 3-hydroxy-2-naphthoic acid 3-nitroanilide | 61.1 | purple |
| 13 | 4 | 3-hydroxy-2-naphthoic acid 4-nitroanilide | 74.9 | purplish red |
| 14 | 121 | 3-hydroxy-N-phenyl-anilino-naphthoamide | 74.7 | purple |

TABLE 3-continued

| Example No. | Disazo Compound No. | Coupling Component | Yield (%) | Appearance |
|---|---|---|---|---|
| 15 | 164 | 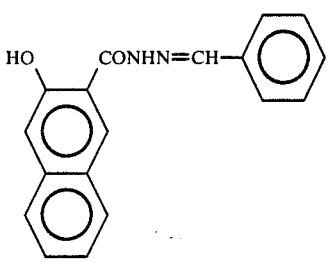 | 65.2 | purplish red |
| 16 | 71 | 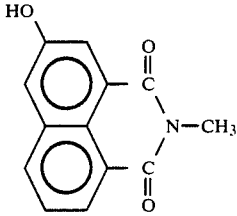 | 66.8 | reddish brown |

Figure 17:
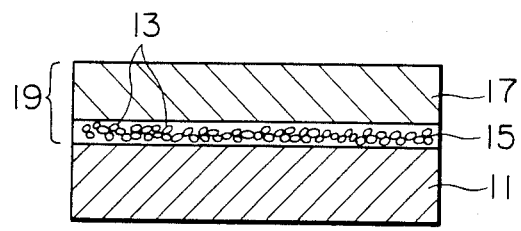
FIGS. 17 and 18 are enlarged sectional views showing a structure example of the electrophotographic element of the present invention.
Figure 18:
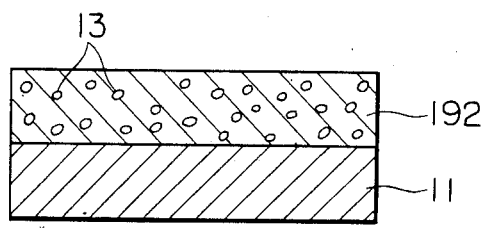

The disazo pigment of the present invention is used as a charge generating material in a photosensitive layer of an electrophotographic element. FIGS. 17 and 18 illustrate a typical structure of the electrophotographic element.

The electrophotographic element of FIG. 17 comprises a laminated type photosensitive layer 19 on an electroconductive substrate 11, said photosensitive layer 19 comprising a charge generating layer 15 containing disazo pigment 13 as the main component and a charge transfer layer 17 containing charge transfer material as the main component.

In the electrophotographic element of FIG. 17, exposed light passes through a charge transfer layer to a charge generating layer 15 wherein charge is generated in disazo pigment 13. The charge thus generated is transferred by the charge transfer layer 17. Thus, the generation of charge necessary for light decay is effected in disazo pigment 13, and the transfer of the generated charge is effected by the charge transfer layer 17.

The electrophotographic element shown in FIG. 18 is composed of a photosensitive layer 192 on an electroconductive substrate 11, the photosensitive layer 192 comprising essentially of disazo pigment 13, charge transfer material and insulative binder. The disazo pigment 13 is a charge generating material.

It is possible to modify the basic structure of the electrophotographic element of FIG. 17, for example, by applying the charge generating layer and the charge transfer layer in reverse order.

The thickness of the charge generating layer 15 of the photosensitive layer of FIG. 17 is preferably 0.01–5μ, more preferably 0.05–2μ. If this thickness is less than 0.01μ, the generation of charge is not satisfactory. On the other hand, if this thickness is more than 5μ, the residual potential becomes too high for practical use.

The thickness of the charge transfer layer 17 is preferably 3–50μ, more preferably 5–20μ. If this thickness is less than 3μ, a charged amount is insufficient. On the other hand, if this thickness is more than 50μ, the residual potential becomes too high for practical use.

The charge generating layer 15 contains disazo pigment expressed by the above general formula as the main component, and further binder, plasticizer and the like. The amount of disazo pigment in the charge generating layer is more than 30% by weight, more preferably 50% by weight.

The charge transfer layer 17 contains charge transfer material and binder as the main components and further plasticizer and the like. The amount of the charge transfer material in the charge transfer layer is 10–95% by weight, preferably 30–90% by weight. If the amount of the charge transfer material is less than 10% by weight, the transfer of the charge is not substantially carried out. On the other hand, if this amount is more than 95% by weight, the mechanical strength of the photosensitive film is too poor for practical use.

The photosensitive layer 192 of the photosensitive element of FIG. 18 is preferably 3–50μ, more preferably 5–20μ. The amount of the disazo pigment in the photosensitive layer 192 is preferably less than 50% by weight, more preferably less than 20% by weight, and the amount of the charge transfer material is preferably 10–95% by weight, more preferably 30–90% by weight.

The essential feature of the present invention resides in the use of specific disazo pigments as expressed by the above general formula I, and other components such as electroconductive substrate, charge transfer material and the like are the same as the conventionally known materials. Examples of these materials are illustrated hereinafter.

Examples of the electroconductive substrate used in the electrophotgraphic element of the present invention include: metallic plates such as aluminum, copper, zinc and the like; plastic sheets such as polyester and the like; plastic film composite obtained by vapor depositing electroconductive materials such as aluminum, $SnO_2$ and the like on a plastic film; or electroconductively treated paper and the like.

Examples of binders include: condensation type resins such as polyamide, polyurethane, polyester, epoxy resin, polyketone, polycarbonate and the like; vinyl polymers such as polyvinyl ketone, polystyrene, poly-N-vinyl carbazole, polyacrylamide, and the like. Any resin can be used if it is insulative and adhesive.

Examples of plasticizers include halogenated paraffin, polybiphenylchloride, dimethylnaphthalene, dibutyl phthalate and the like. Silicone oil may also be added to improve surface properties of the photosensitive material.

The charge transfer material includes a positive hole transfer material and an electron transfer material. Examples of the hole transfer material include compounds as expressed by the following general formula (1) to (11).

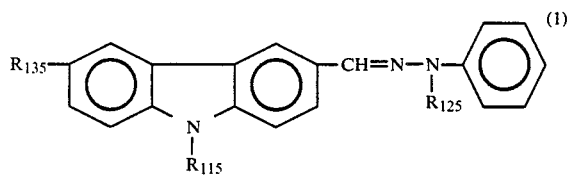
(1)

(wherein $R_{115}$ represents methyl, ethyl, 2-hydroxyethyl or 2-chloroethyl; $R_{125}$ represents methyl, ethyl, benzyl or phenyl; and $R_{135}$ represents hydrogen, chlorine, bromine, alkyl having 1 to 4 carbon atoms, alkoxy having 1 to 4 carbon atoms, dialkylamino or nitro.)

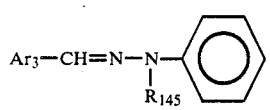
(2)

(wherein $Ar_3$ represents naphthalene ring, anthracene ring, styryl and their substituents or pyridine ring furan ring, or thiophene ring; and $R_{145}$ represents alkyl or benzyl.)

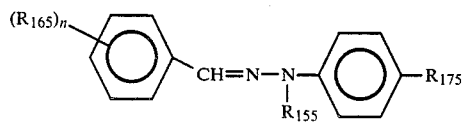
(3)

(wherein $R_{155}$ represents alkyl, benzyl, phenyl or naphthyl; $R_{165}$ represents hydrogen, alkyl having 1 to 3 carbon atoms, alkoxy having 1 to 3 carbon atoms, dialkylamino, diaralkylamino or diarylamino; n represents an integer of 1 to 4; when n is 2 or more, $R_{165}$ may be the same or different; and $R_{175}$ represents hydrogen or methoxy.)

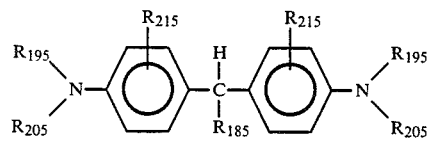
(4)

(wherein $R_{185}$ represents alkyl having 1 to 11 carbon atoms, substituted or non-substituted phenyl or heterocyclic group; $R_{195}$ and $R_{205}$ may be the same or different and represent hydrogen, alkyl having 1 to 4 carbon atoms, hydroxyalkyl, chloroalkyl, substituted or non-substituted aralkyl; $R_{195}$ and $R_{205}$ may be bonded with each other to form a heterocyclic ring containing nitrogen; $R_{215}$ may be the same or different and represents hydrogen alkyl having 1 to 4 carbon atoms, alkoxy or halogen.)

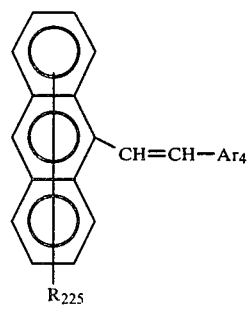
(5)

(wherein $R_{225}$ represents hydrogen or a halogen atom; and $Ar_4$ represents substituted or non-substituted phenyl, naphthyl, anthryl or carbazolyl.)

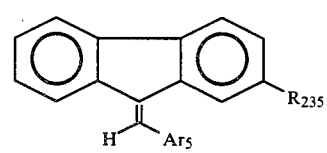
(6)

(wherein $R_{235}$ represents hydrogen, halogen, cyano, alkoxy having 1 to 4 carbon atoms or alkyl having 1 to 4 carbon atoms; $Ar_5$ represents

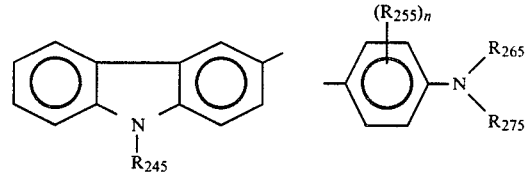

wherein $R_{245}$ represents alkyl having 1 to 4 carbon atoms, $R_{255}$ represents hydrogen, halogen, alkyl having 1 to 4 carbon atoms, alkoxy having 1 to 4 carbon atoms or dialkyl amino, n is an integer of 1 or 2; when n is 2, $R_{255}$ may be the same or different; $R_{265}$ and $R_{275}$ represent hydrogen, substituted or non-substituted alkyl having 1 to 4 carbon atoms or substituted or non-substituted benzyl group.)

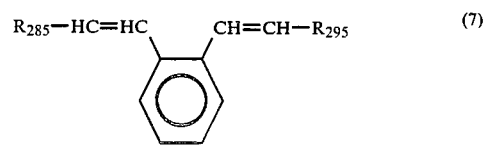
(7)

(wherein $R_{285}$ and $R_{295}$ represents carbazolyl, pyridyl, thienyl, indolyl, furyl, or substituted or non-substituted phenyl styryl, naphthyl or anthryl group; these substituents are selected from the group of dialkylamino, alkyl, alkoxy, carboxyl or its ester, halogen atom, cyano, aralkylamino, N-alkyl-N-aralkylamino, amino, nitro and acetyl amino groups.)

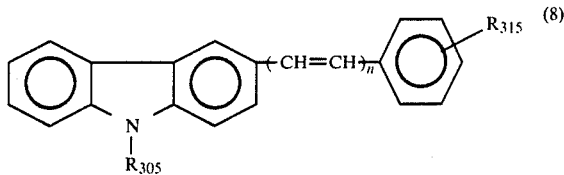
(8)

(wherein $R_{305}$ represents a lower alkyl or benzyl group; $R_{315}$ represents hydrogen, lower alkyl, lower alkoxy, halogen, nitro, amino, or amino group substituted with lower alkyl or benzyl; and n is an integer of 1 or 2.)

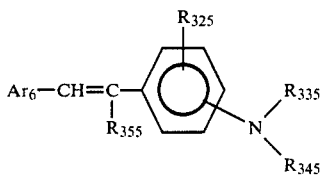
(9)

(wherein $R_{325}$ represents hydrogen, alkyl, alkoxy or halogen; $R_{335}$ and $R_{345}$ represent alkyl, substituted or non-substituted aralkyl, or substituted or non-substituted aryl group; $R_{355}$ represents hydrogen or substituted or non-substituted phenyl; and $Ar_6$ represents phenyl or naphthyl group.)

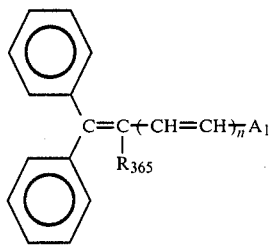
(10)

(wherein n is an integer of 0 or 1; $R_{365}$ represents hydrogen, alkyl or substituted or non-substituted phenyl; $A_1$ represents

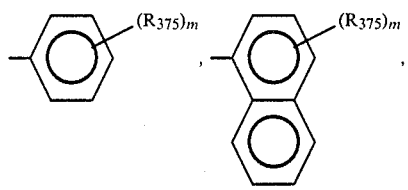

9-anthryl, or substituted or non-substituted N-alkylcarbazolyl group, wherein $R_{375}$ represents hydrogen, alkyl, alkoxy, halogen or

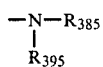

wherein $R_{385}$ and $R_{395}$ represent alkyl, substituted or non-substituted aralkyl, or substituted or non-substituted aryl group, and $R_{385}$ and $R_{395}$ may form a ring; and m is an integer of 0, 1, 2 or 3, when m is 2 or more, $R_{375}$ may be the same or different.)

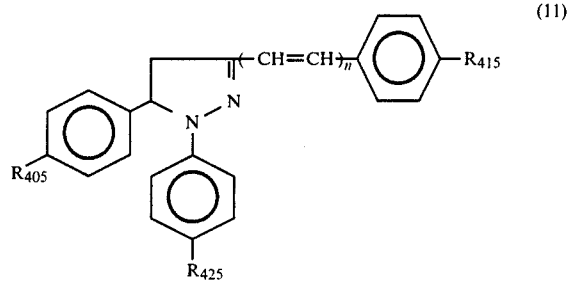
(11)

(wherein $R_{405}$, $R_{415}$ and $R_{425}$ are hydrogen, lower alkyl, lower alkoxy, dialkylamino, or halogen; and n is 0 or 1.)

Examples of the compound expressed by the general formula (1) include: 9-ethylcarbazole-3-aldehyde-1-methyl-1-phenylhydrazone, 9-ethylcarbazole-3-aldehyde-1-benzyl-1-phenylhydrazone, 9-ethylcarbazole-3-aldehyde 1,1-diphenylhydrazone, and the like.

Examples of the compound expressed by the general formula (2) include: 4-diethylaminostyrene-β-aldehyde-1-methyl-1-phenylhydrazone, 4-methoxynaphthalene-1-aldehyde-1-benzyl-1-phenylhydrazone, and the like.

Examples of the compound expressed by the general formula (3) include: 4-methoxybenzaldehyde 1-methyl-1-phenylhydrazone, 2,4-dimethoxybenzaldehyde 1-benzyl-1-phenylhydrazone, 4-diethylaminobenzaldehyde 1,1-diphenylhydrazone, 4-methoxybenzaldehyde 1-benzyl-1-(4-methoxy)phenyl hydrazone, 4-diphenylaminobenzaldehyde-1-benzyl-1-phenylhydrazone, 4-dibenzylaminobenzaldehyde 1,1-diphenylhydrazone and the like.

Examples of the compound expressed by the general formula (4) include: 1,1-bis(4-dibenzylaminophenyl)-propane, tris(4-diethylaminophenyl)methane, 1,1-bis(4-dibenzylaminophenyl)propane, 2,2'-dimethyl-4,4'-bis(-diethylamino)-triphenylmethane and the like.

Examples of the compound expressed by the general formula (5) include: 9-(4-diethylaminostyryl)anthracene, 9-bromo-10-(4-diethylaminostyryl)anthracene, and the like.

Examples of the compound expressed by the general formula (6) include: 9-(4-dimethylaminobenzylidene)-fluorene, 3-(9-fluorenylidene)-9-ethylcarbazole, and the like.

Examples of the compound expressed by the general formula (7) include: 1,2-bis(4-diethylaminostyryl)benzene, 1,2-bis(2,4-dimethoxystyryl)benzene and the like.

Examples of the compound expressed by the general formula (8) include: 3-styryl-9-ethylcarbazole, 3-(4-methoxystyryl)-9-ethylcarbazole, and the like.

Examples of the compound expressed by the general formula (9) include: 4-diphenylaminostilbene, 4-dibenzylaminostilbene, 4-ditolylaminostilbene, 1-(4-diphenylaminostyryl)naphthalene, 1-(4-diethylaminostyryl)naphthalene, and the like.

Examples of the compound expressed by the general formula (10) include: 4'-diphenylaminoalpha-phenylstilbene, 4'-methylphenylamino-alphaphenylstilbene, and the like.

Examples of the compound expressed by the general formula (11) include: 1-phenyl-3-(4-diethylaminostyryl)-5-(4-diethylaminophenyl)pyrazoline, 1-phenyl-3-(4-dimethylaminostyryl)-5-(4-dimethylaminophenyl)-pyrazoline, and the like.

Other examples of positive hole transfer material include: oxadiazole compounds such as 2,5-bis(4-diethylaminophenyl)-1,3,4-oxadiazole, 2,5-bis(4-(4-diethylaminostyryl)phenyl)-1,3,4-oxadiazole, 2-(9-ethylcarbazolyl-3)-5-(4-diethylaminophenyl)-1,3,4-oxadiazole, and the like; low molecular oxazole compounds such as 2-vinyl-4-(2-chlorophenyl)-5-(4-diethylaminophenyl)-oxazole, 2-(4-diethylaminophenyl)-4-phenyloxazole, and the like; and high molecular compounds such as poly-N-vinyl carbazole, halogenated poly-N-vinyl carbazole, polyvinyl pyrene, polyvinyl anthracene, pyrene formaldehyde resin, ethylcarbazole formaldehyde resin, and the like.

Examples of electron transfer material include: chloranil, bromoanil, tetracyanoethylene, tetracyanoquinonedimethane, 2,4,7-trinitro-9-fluorenone, 2,4,5,7-tetranitro-9-fluorenone, 2,4,5,7-tetranitroxanthone, 2,4,8-trinitro-thioxanthone, 2,6,8-trinitro-4H-indeno(1,2-b)-thiophene-4-on, 1,3,7-trinitrodibenzothiophene-5,5-dioxide, and the like.

These charge transfer materials are used alone or in the form of a mixture of two or more.

With regard to the electrophotographic elements as prepared above, an adhesive layer or barrier layer may optionally be applied between an electroconductive substrate and a photosensitive layer. Examples of these layers include polyamide, nitrocellulose, aluminum oxide and the like. The thickness of the layer is preferably not more than 1μ.

The electrophotographic element as shown in FIG. 17 is prepared by vapor-depositing disazo pigment on an electroconductive substrate in accordance with vacuum vapor depositing method as disclosed in U.S. Pat. Nos. 3,973,959 and 3,996,049 or coating and drying on an electroconductive substrate a dispersion of disazo pigment particles in an appropriate solvent optionally having a binder dissolved; and then coating and drying a solution containing charge transfer material and binder on the charge generating layer, the surface of which may optionally be subjected to a buff polishing as disclosed in Japanese Patent Laid Open No. 51-90827, or the thickness of which may be regulated.

The electrophotographic element as shown in FIG. 18 is prepared by dispersing disazo pigment particles in a solution having charge transfer material and binder dissolved, coating the dispersion on an electroconductive substrate and drying. In any case, disazo pigment used in the present invention is powdered by a ball mill or the like to a particle size of not more than 5μ, preferably not more than 2μ. Coating can be effected by ordinary method by means of doctor blade, dipping, wire bar and the like.

Copying by the electrophotographic element of the present invention can be effected by developing after charging and exposing the photosensitive layer surface and, if necessary, transferring the developed image to paper and the like.

As clearly seen from the above description and the following Examples, the electrophotographic element of the present invention using disazo pigment having the dibenzylidenecyclohexanone structure as a charge generating material can be more easily produced and has a photosensitive wavelength zone in the range of a shorter wavelength range (about 450–600 nm) in comparison with the conventional electrophotographic elements. In addition to these advantages, performances of the electrophotographic element of the present invention are stable even if it is repeatedly used a great number of times.

The present invention is further illustrated by the following Examples, but the present invention should not be limited thereto.

EXAMPLE 1

76 parts by weight of disazo pigment No. 1, 1260 parts by weight of tetrahydrofuran solution (solid content=2%) of polyester resin ("Byron 200" manufactured by Toyo Boseki Ltd.), and 3700 parts by weight of tetrahydrofuran are powdered and mixed in a ball mill. The dispersion thus obtained was coated on an aluminum surface of an aluminum-deposited polyester base (electroconductive substrate) by a doctor blade, and the coated film was allowed to stand for drying, thereby forming a charge generating layer having a thickness of about 1 μm.

On this charge generating layer, was coated a solution prepared by dissolving and mixing 2 parts by weight of 9-ethylcarbazole-3-aldehyde 1-methyl-1-phenylhydrazone, 2 parts by weight of polycarbonate resin ("Panlight K-1300" manufactured by Teijin Co., Ltd.) and 16 parts by weight of tetrahydrofuran by a doctor blade, and the coated film was dried at 80° C. for 2 minutes and 105° C. for 5 minutes, thereby forming a charge transfer layer having a thickness of about 20 μm. The laminated type electrophotographic element No. 1 thus prepared is shown in FIG. 17.

EXAMPLE 2 TO 10

Electrophotographic elements Nos. 2 to 10 were prepared in the same manner as in Example 1, except that disazo pigments as shown in the following Table 4 were used in place of disazo pigment No. 1 used in Example 1.

EXAMPLES 11 TO 15

Electrophotographic elements Nos. 11 to 15 were prepared in the same manner as in Example 1, except that 1-phenyl-3-(4-diethylaminostyryl)-5-(4-diethylaminophenyl)pyrazoline was used as a charge transfer material and disazo pigments as shown in the following Table 5 were used.

EXAMPLES 16 TO 24

Electrophotographic elements Nos. 16 to 24 were prepared in the same manner as in Example 1, except that 4'-diphenylamino-α-phenylstilbene was used as a charge transfer material and disazo pigments as shown in the following Table 6 were used.

EXAMPLES 25

Electrophotographic element No. 25 was prepared in the same manner as in Example 1, except that 1,1-bis(4-dibenzylaminophenyl)propane was used as a charge transfer material and a disazo pigment as shown in the following Table 7 was used.

The thus prepared electrophotographic elements Nos. 1 to 25 were subjected to −6 KV corona discharge for 20 seconds by an electrostatic copying paper tester (SP428 Type produced by Kawaguchi Denki Works), and were charged negatively. Thereafter, these elements were left to stand in the dark for 20 seconds to measure the surface potential Vpo (V) at that time, and were exposed to radiation of a tungsten lamp so that the intensity of surface illumination may become 4.5 Lux. Then, the time (sec.) required until the surface potential was reduced to ½ of Vpo was measured, and the exposure amount E½ (Lux-sec) was calculated. The results thus obtained are shown in Tables 4 to 7.

TABLE 4

| Photosensitive Material No. | Disazo Compound No. | Vpo (volt) | E½ (Lux · sec) |
| --- | --- | --- | --- |
| 1 | 1 | −798 | 9.1 |
| 2 | 29 | −1120 | 7.2 |
| 3 | 17 | −1176 | 5.4 |
| 4 | 18 | −1332 | 9.3 |
| 5 | 2 | −1206 | 10.8 |
| 6 | 3 | −918 | 4.0 |
| 7 | 4 | −1198 | 5.8 |
| 8 | 12 | −938 | 9.3 |
| 9 | 164 | −1282 | 10.2 |
| 10 | 71 | −684 | 2.2 |

TABLE 5

| Photosensitive Material No. | Disazo Compound No. | Vpo (volt) | E½ (Lux · sec) |
| --- | --- | --- | --- |
| 11 | 1 | −746 | 5.8 |
| 12 | 29 | −696 | 6.8 |
| 13 | 2 | −886 | 6.4 |
| 14 | 121 | −446 | 5.2 |
| 15 | 164 | −666 | 10.5 |

TABLE 6

| Photosensitive Material No. | Disazo Compound No. | Vpo (volt) | E½ (Lux · sec) |
| --- | --- | --- | --- |
| 16 | 1 | −890 | 9.7 |
| 17 | 29 | −1194 | 8.1 |
| 18 | 17 | −1182 | 4.6 |
| 19 | 18 | −1320 | 10.4 |
| 20 | 2 | −1206 | 13.9 |
| 21 | 3 | −806 | 4.6 |
| 22 | 4 | −1234 | 3.1 |
| 23 | 164 | −1430 | 11.5 |
| 24 | 71 | −812 | 3.6 |

TABLE 7

| Photosensitive Material No. | Disazo Compound No. | Vpo (volt) | E½ (Lux · sec) |
| --- | --- | --- | --- |
| 25 | 71 | −1136 | 9.3 |

In order to make comparison, a comparative photosensitive material was prepared in quite the same manner as in the above photosensitive materials of the present invention, except that a stilbene type disazo compound, i.e. 4,4′-bis(2-hydroxy-3-phenylcarbamoyl-1-naphthylazo)stilbene was used in place of the disazo compounds of the present invention.

The comparative photosensitive material thus obtained and the photosensitive material No. 10 of the present invention were then subjected to the electrostatic copying paper tester in the same manner as above, thus measuring Vdo, Vpo, E½, E1/5, and E1/10. The results are shown in the following Table 8.

TABLE 8

| Photosensitive Material | Vdo (V) | Vpo (V) | Vpo/Vdo | E½ (Lux · sec) | E1/5 (Lux · sec) | E1/10 (Lux · sec) |
| --- | --- | --- | --- | --- | --- | --- |
| Photosensitive Material No. 10 of this invention | −1076 | −684 | 0.636 | 2.2 | 3.0 | 4.5 |
| Comparative Photosensitive Material | −1817 | −1501 | 0.826 | 19.3 | 51.0 | 75.0 |

As proved by data in the above Tables 4 to 8, the photosensitive material of the present invention has a higher sensitivity.

The photosensitive materials Nos. 6 and 21 of the present invention were set in an electrophotographic copying machine (Ricopy-P-500 Type produced by RICOH K.K.), and the image-formation was repeated 10,000 times. As these results, each photosensitive material was found to form a clear-cut image regardless of the numerous repetition of image-formation. It should be understood from these results that the photosensitive materials of the present invention are excellent also in durability.

What is claimed is:

1. A photosensitive material for use in electrophotography, comprising an electroconductive substrate and a photosensitive layer containing a disazo pigment of the following formula,

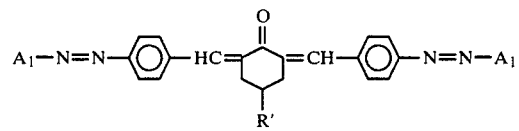

wherein
R′ represents hydrogen or lower alkyl, and A₁ represents a coupler residue selected from the group consisting of

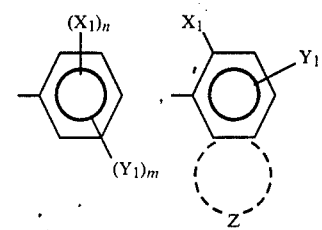

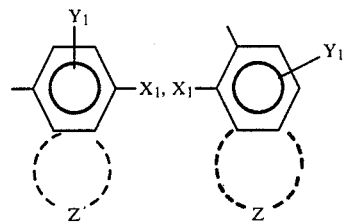

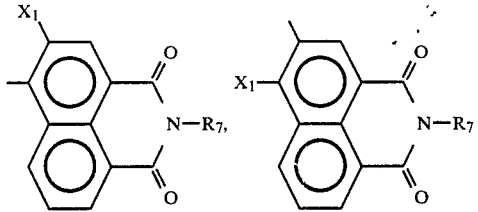

-continued

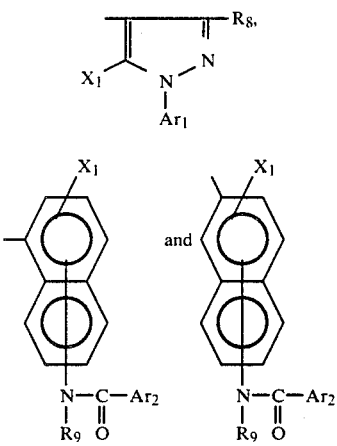

wherein
$X_1$ is —OH,

or —NHSO$_2$—R$_3$,
in which
R$_1$ and R$_2$ represent hydrogen or alkyl, and R$_3$ represents alkyl or aryl;
Y$_1$ is hydrogen, halogen, alkyl, alkoxy, carboxyl, sulfo, sulfamoyl,

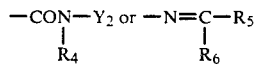

in which
R$_4$ represents hydrogen, alkyl, phenyl or phenyl substituted with halogen, Y$_2$ represents substituted or unsubstituted phenyl, naphthyl, anthryl, pyrenyl, pyridyl, thienyl, furyl, indolyl, benzofuranyl, carbazolyl or dibenzofuranyl, R$_5$ represents substituted or unsubstituted phenyl, naphthyl, anthryl, pyrenyl, pyridyl, thienyl, furyl, indolyl, benzofuranyl, carbazolyl, dibenzofuranyl or styryl, and R$_6$ represents hydrogen, alkyl, phenyl or phenyl substituted with halogen, or

forms a substituted or unsubstituted ring, the substituents for the substituted groups of Y$_2$, R$_5$ and for the ring formed by bonding R$_5$ and R$_6$ being selected from the group consisting of alkyl, alkoxy, halogen, dialkylamino, diaralkylamino, halomethyl, nitro, cyano, carboxyl —COOCH$_3$, —COOC$_2$H$_5$, —COOC$_6$H$_5$, hydroxyl and —SO$_3$Na;
Z is selected from the group consisting of benzene, benzene substituted with halogen, naphthalene, naphthalene substituted with halogen, indole, indole substituted with halogen, carbazole, carbazole substituted with halogen, benzofuran and benzofuran substituted with halogen,
n is an integer of 1 or 2;
m is an integer of 1 or 2,
R$_7$ is alkyl, substituted alkyl, aralkyl, substituted aralkyl, aryl or substituted aryl, in which the substituent is alkyl, alkoxy, halogen, hydroxy or nitro;
R$_8$ is alkyl, carbamoyl, carboxyl, —COOCH$_3$, —COOC$_2$H$_5$ or —COOC$_6$H$_5$; Ar$_1$ represents unsubstituted phenyl, substituted phenyl, unsubstituted naphthyl or substituted naphthyl, the substituent of which is selected from the group consisting of alkyl, alkoxy, nitro, halogen, cyano and diethylamino; R$_9$ is the same as defined above for R$_7$; and Ar$_2$ is the same as defined above for Ar$_1$.

2. The photosensitive material as claimed in claim 1, wherein A$_1$ has the formula,

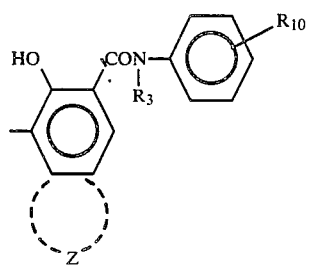

or

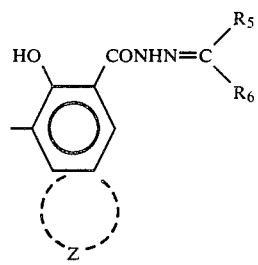

wherein Z, R$_2$, R$_5$ and R$_6$ are the same as defined above, and R$_{10}$ is the same as Y$_2$.

3. The photosensitive material as claimed in claim 1 in which A, is

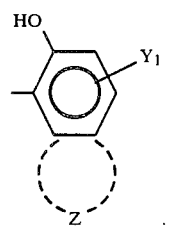

4. The photosensitive material as claimed in claim 1, wherein A$_1$ has the formula,

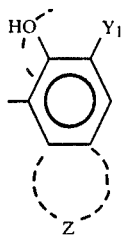

wherein $Y_1$ and Z are the same as defined above.

5. The photosensitive material as claimed in claim 1, wherein $A_1$ has the formula,

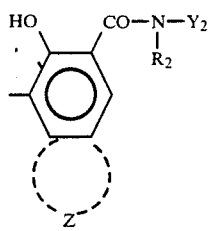

wherein

Z, $Y_2$ and $R_2$ are the same as defined above.

6. The photosensitive material as claimed in claim 1 in which $A_1$ is

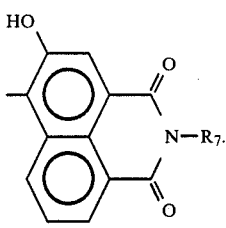

7. The photosensitive material as claimed in claim 1 in which $A_1$ is

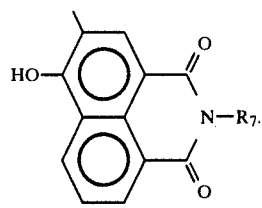

8. The photosensitive material as claimed in claim 1 in which $A_1$ is

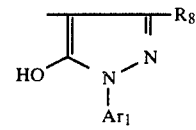

9. The photosensitive material as claimed in claim 1 in which $A_1$ is

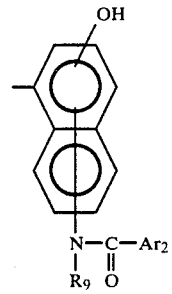

10. The photosensitive material as claimed in claim 1 in which $A_1$ is

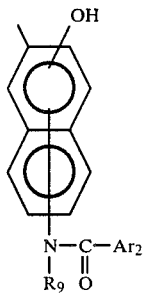

* * * * *